(12) United States Patent
Eoff et al.

(10) Patent No.: US 7,552,771 B2
(45) Date of Patent: Jun. 30, 2009

(54) METHODS TO ENHANCE GAS PRODUCTION FOLLOWING A RELATIVE-PERMEABILITY-MODIFIER TREATMENT

(75) Inventors: Larry S. Eoff, Duncan, OK (US); B. Raghava Reddy, Duncan, OK (US); Eldon D. Dalrymple, Duncan, OK (US); Don M. Everett, Houston, TX (US); Mauricio Gutierrez, Bogota (CO); Danhua Zhang, Houston, TX (US)

(73) Assignee: Halliburton Energy Services, Inc., Duncan, OK (US)

( * ) Notice: Subject to any disclaimer, the term of this patent is extended or adjusted under 35 U.S.C. 154(b) by 0 days.

(21) Appl. No.: 11/985,154

(22) Filed: Nov. 14, 2007

(65) Prior Publication Data

US 2009/0120642 A1    May 14, 2009

(51) Int. Cl.
*E21B 43/25*        (2006.01)
*E21B 43/295*       (2006.01)
(52) U.S. Cl. .................... 166/279; 166/300; 166/309; 166/371
(58) Field of Classification Search ............... None
See application file for complete search history.

(56) References Cited

U.S. PATENT DOCUMENTS

| | | | |
|---|---|---|---|
| 2,278,838 A | 4/1942 | Groote et al. |
| 2,670,329 A | 2/1954 | Jones |
| 2,689,244 A | 9/1954 | Jones |
| 2,819,278 A | 1/1958 | De Groots et al. |
| 2,843,573 A | 7/1958 | Melamed |
| 2,863,832 A | 12/1958 | Perrine |
| 2,877,179 A | 3/1959 | Hughes et al. |
| 2,910,436 A | 10/1959 | Fatt et al. |
| 3,008,898 A | 11/1961 | Hughes et al. |
| 3,052,298 A | 9/1962 | Mallot |
| 3,065,247 A | 11/1962 | De Groots et al. |
| 3,215,199 A | 11/1965 | Dilgren |
| 3,251,415 A | 5/1966 | Bombardieri et al. |
| 3,251,778 A | 5/1966 | Dickson et al. |
| 3,258,428 A | 6/1966 | Dickson et al. |
| 3,265,512 A | 8/1966 | Dickson et al. |
| 3,271,307 A | 9/1966 | Dickson et al. |
| 3,297,090 A | 1/1967 | Dilgren |
| 3,307,630 A | 3/1967 | Dilgren et al. |
| 3,326,890 A | 6/1967 | Engelskirchen et al. |
| 3,336,980 A | 8/1967 | Rike |
| 3,347,789 A | 10/1967 | Dickson et al. |
| 3,382,924 A | 5/1968 | Veley et al. |
| 3,404,114 A | 10/1968 | Snyder et al. |
| 3,434,971 A | 3/1969 | Atkins |
| 3,441,085 A | 4/1969 | Gidley |
| 3,451,818 A | 6/1969 | Wareham |
| 3,489,222 A | 1/1970 | Millhone et al. |
| 3,601,194 A | 8/1971 | Gallus |
| 3,647,507 A | 3/1972 | Ashcraft |
| 3,647,567 A | 3/1972 | Schweri |
| 3,653,442 A | 4/1972 | Ross |
| 3,689,418 A | 9/1972 | Cenci et al. |
| 3,689,468 A | 9/1972 | Warminster |
| 3,708,013 A | 1/1973 | Dismukes |
| 3,709,298 A | 1/1973 | Pramann |
| 3,744,566 A | 7/1973 | Szabo et al. |
| 3,902,557 A | 9/1975 | Shaughnessy et al. |
| 3,910,862 A | 10/1975 | Barabas et al. |
| 3,943,060 A | 3/1976 | Martin et al. |
| 3,983,941 A | 10/1976 | Fitch |
| 4,052,343 A | 10/1977 | Cunningham |
| 4,052,345 A | 10/1977 | Austin et al. |
| 4,074,536 A | 2/1978 | Young |
| 4,129,183 A | 12/1978 | Kalfoglou |
| 4,129,534 A | 12/1978 | Cunningham |

(Continued)

FOREIGN PATENT DOCUMENTS

DE        2 250 552        4/1974

(Continued)

OTHER PUBLICATIONS

Botermans, C. Wouter, et al, *Relative Permeability Modifiers: Myth or Reality?*, SPE eLibrary Paper No. 68973, 2001, Society of Petroleum Engineers, Inc., presented at SPE European Formation Damage Conference, The Hague, The Netherlands, May 21-22, pp. 1-2.

(Continued)

*Primary Examiner*—Zakiya W. Bates
(74) *Attorney, Agent, or Firm*—Robert A. Kent; Baker Botts LLP

(57) ABSTRACT

Provided embodiments relate to introducing a water-drainage-rate-enhancing agent into a subterranean formation to enhance gas production following a relative-permeability-modifier treatment to decrease undesired water production. An exemplary embodiment provides a method of treating a subterranean formation such that initiation of gas production is enhanced following the treatment, the method comprising: introducing a relative-permeability modifier into at least a portion of the subterranean formation such that the relative-permeability modifier reduces permeability of the portion to aqueous fluids; and introducing a water-drainage-rate-enhancing agent into at least a portion of the subterranean formation. Another exemplary embodiment provides a treatment fluid comprising a carrier fluid, a relative-permeability modifier, and a water-drainage-rate-enhancing agent.

26 Claims, 6 Drawing Sheets

U.S. PATENT DOCUMENTS

| | | |
|---|---|---|
| 4,142,595 A | 3/1979 | Anderson et al. |
| 4,152,274 A | 5/1979 | Phillips et al. |
| 4,158,521 A | 6/1979 | Anderson et al. |
| 4,158,726 A | 6/1979 | Kamada et al. |
| 4,226,284 A | 10/1980 | Evans |
| 4,228,277 A | 10/1980 | Landoll |
| 4,299,710 A | 11/1981 | Dupre et al. |
| 4,306,981 A | 12/1981 | Blair, Jr. |
| 4,337,828 A | 7/1982 | Blair, Jr. |
| 4,366,071 A | 12/1982 | McLaughlin et al. |
| 4,366,072 A | 12/1982 | McLaughlin et al. |
| 4,366,073 A | 12/1982 | McLaughlin et al. |
| 4,366,074 A | 12/1982 | McLaughlin et al. |
| 4,374,739 A | 2/1983 | McLaughlin et al. |
| 4,393,939 A | 7/1983 | Smith et al. |
| 4,395,340 A | 7/1983 | McLaughlin |
| 4,401,789 A | 8/1983 | Gideon |
| 4,418,195 A | 11/1983 | Quinlan |
| 4,439,334 A | 3/1984 | Borchardt |
| 4,440,649 A | 4/1984 | Loftin et al. |
| 4,441,556 A | 4/1984 | Powers et al. |
| 4,447,342 A | 5/1984 | Borchardt et al. |
| 4,460,627 A | 7/1984 | Weaver et al. |
| 4,462,718 A | 7/1984 | McLaughlin et al. |
| 4,499,214 A | 2/1985 | Sortwell |
| 4,532,052 A | 7/1985 | Weaver et al. |
| 4,536,297 A | 8/1985 | Loftin et al. |
| 4,536,303 A | 8/1985 | Borchardt |
| 4,536,305 A | 8/1985 | Borchardt et al. |
| 4,552,670 A | 11/1985 | Lipowski et al. |
| 4,554,081 A | 11/1985 | Borchardt et al. |
| 4,563,292 A | 1/1986 | Borchardt |
| 4,596,662 A | 6/1986 | Walker et al. |
| 4,604,216 A | 8/1986 | Irvin et al. |
| 4,608,139 A | 8/1986 | Craun et al. |
| 4,619,776 A | 10/1986 | Mondshine |
| 4,627,926 A | 12/1986 | Peiffer et al. |
| 4,662,448 A | 5/1987 | Ashford et al. |
| 4,671,883 A | 6/1987 | Connell |
| 4,693,639 A | 9/1987 | Hollenbeak et al. |
| 4,699,722 A | 10/1987 | Dymond et al. |
| 4,702,319 A | 10/1987 | Bock et al. |
| 4,702,849 A | 10/1987 | Penny |
| 4,730,028 A | 3/1988 | Bock et al. |
| 4,814,096 A | 3/1989 | Evani |
| 4,828,725 A | 5/1989 | Lai et al. |
| 4,828,726 A | 5/1989 | Himes et al. |
| 4,856,590 A | 8/1989 | Caillier |
| 4,870,167 A | 9/1989 | Zody et al. |
| 4,941,537 A | 7/1990 | Langemeier et al. |
| 4,956,104 A | 9/1990 | Cowan et al. |
| 4,959,432 A | 9/1990 | Fan et al. |
| 4,960,876 A | 10/1990 | Molteni et al. |
| 5,051,197 A | 9/1991 | Kalfayan et al. |
| 5,071,934 A | 12/1991 | Peiffer |
| 5,097,904 A | 3/1992 | Himes |
| 5,098,979 A | 3/1992 | O'Lenick, Jr. |
| 5,105,886 A | 4/1992 | Strubhar et al. |
| 5,146,986 A | 9/1992 | Dalrymple |
| 5,160,642 A | 11/1992 | Schield et al. |
| 5,197,544 A | 3/1993 | Himes |
| 5,208,216 A | 5/1993 | Williamson et al. |
| 5,229,017 A | 7/1993 | Nimerick et al. |
| 5,244,042 A | 9/1993 | Dovan et al. |
| 5,248,665 A | 9/1993 | Hale et al. |
| 5,249,627 A | 10/1993 | Harms et al. |
| 5,256,651 A | 10/1993 | Phelps et al. |
| 5,271,466 A | 12/1993 | Harms |
| 5,310,002 A | 5/1994 | Blauch et al. |
| 5,339,905 A | 8/1994 | Dowker |
| 5,342,530 A | 8/1994 | Aften et al. |
| 5,379,841 A | 1/1995 | Pusch et al. |
| 5,382,371 A | 1/1995 | Stahl et al. |
| 5,424,284 A | 6/1995 | Patel et al. |
| 5,445,223 A | 8/1995 | Nelson et al. |
| 5,473,059 A | 12/1995 | Yeh |
| 5,597,783 A | 1/1997 | Audibert et al. |
| 5,602,224 A | 2/1997 | Vrckovink et al. |
| 5,607,902 A | 3/1997 | Smith et al. |
| 5,637,556 A | 6/1997 | Argillier et al. |
| 5,643,460 A | 7/1997 | Marble et al. |
| 5,646,093 A | 7/1997 | Dino |
| 5,669,456 A | 9/1997 | Audibert et al. |
| 5,681,796 A | 10/1997 | Nimerick |
| 5,704,426 A | 1/1998 | Rytlewski et al. |
| 5,720,347 A | 2/1998 | Audibert et al. |
| 5,728,653 A | 3/1998 | Audibert et al. |
| 5,735,349 A | 4/1998 | Dawson et al. |
| 5,741,367 A | 4/1998 | Inada et al. |
| 5,887,653 A | 3/1999 | Bishop et al. |
| 5,908,814 A | 6/1999 | Patel et al. |
| 5,944,106 A | 8/1999 | Dalrymple et al. |
| 5,972,848 A | 10/1999 | Audibert et al. |
| 5,979,557 A | 11/1999 | Card et al. |
| 5,990,052 A | 11/1999 | Harris |
| 6,020,289 A | 2/2000 | Dymond |
| 6,070,664 A | 6/2000 | Dalrymple et al. |
| 6,124,245 A | 9/2000 | Patel |
| 6,165,948 A | 12/2000 | Dewenter et al. |
| 6,187,839 B1 | 2/2001 | Eoff et al. |
| 6,194,356 B1 | 2/2001 | Jones et al. |
| 6,209,646 B1 | 4/2001 | Reddy et al. |
| 6,228,812 B1 | 5/2001 | Dawson et al. |
| 6,237,687 B1 | 5/2001 | Barbee, Jr. et al. |
| 6,242,390 B1 | 6/2001 | Mitchell et al. |
| 6,253,851 B1 | 7/2001 | Schroeder, Jr. et al. |
| 6,277,900 B1 | 8/2001 | Oswald et al. |
| 6,281,172 B1 | 8/2001 | Warren et al. |
| 6,283,210 B1 | 9/2001 | Soliman et al. |
| 6,291,404 B2 | 9/2001 | House |
| 6,358,889 B2 | 3/2002 | Waggenspack et al. |
| 6,359,047 B1 | 3/2002 | Thieu et al. |
| 6,364,016 B1 | 4/2002 | Dalrymple et al. |
| 6,380,137 B1 | 4/2002 | Heier et al. |
| 6,476,169 B1 | 11/2002 | Eoff et al. |
| 6,476,283 B1 | 11/2002 | Devore et al. |
| 6,497,283 B1 | 12/2002 | Eoff et al. |
| 6,516,885 B1 | 2/2003 | Munday |
| 6,562,762 B2 | 5/2003 | Cowan et al. |
| 6,569,983 B1 | 5/2003 | Treybig et al. |
| 6,601,648 B2 | 8/2003 | Ebinger |
| 6,607,035 B1 | 8/2003 | Reddy et al. |
| 6,609,578 B2 | 8/2003 | Patel et al. |
| 6,626,241 B2 | 9/2003 | Nguyen |
| 6,627,719 B2 | 9/2003 | Whipple et al. |
| 6,637,517 B2 | 10/2003 | Qu et al. |
| 6,656,885 B2 | 12/2003 | House et al. |
| 6,660,693 B2 | 12/2003 | Miller et al. |
| 6,662,874 B2 | 12/2003 | Surjaatmadja et al. |
| 6,710,107 B2 | 3/2004 | Audibert et al. |
| 6,743,288 B2 | 6/2004 | Eoff et al. |
| 6,764,981 B1 | 7/2004 | Eoff et al. |
| 6,767,867 B2 | 7/2004 | Chatterji et al. |
| 6,767,869 B2 | 7/2004 | DiLullo et al. |
| 6,780,822 B2 | 8/2004 | Cowan et al. |
| 6,787,506 B2 | 9/2004 | Blair et al. |
| 6,790,812 B2 | 9/2004 | Halliday et al. |
| 6,803,348 B2 | 10/2004 | Jones et al. |
| 6,846,420 B2 | 1/2005 | Reddy et al. |
| 6,855,672 B2 | 2/2005 | Poelker et al. |
| 6,884,760 B1 | 4/2005 | Brand et al. |
| 6,962,203 B2 | 11/2005 | Funchess |
| 6,978,836 B2 | 12/2005 | Nguyen et al. |
| 6,981,552 B2 | 1/2006 | Reddy et al. |

| | | | |
|---|---|---|---|
| 7,007,752 | B2 | 3/2006 | Reddy et al. |
| 7,008,908 | B2 | 3/2006 | Chan et al. |
| 7,036,587 | B2 | 5/2006 | Munoz, Jr. et al. |
| 7,036,589 | B2 | 5/2006 | Nguyen |
| 7,081,439 | B2 | 7/2006 | Sullivan et al. |
| 7,091,159 | B2 | 8/2006 | Eoff et al. |
| 7,114,568 | B2 | 10/2006 | Eoff et al. |
| 7,117,942 | B2 | 10/2006 | Dalrymple et al. |
| 7,159,656 | B2 | 1/2007 | Eoff et al. |
| 7,182,136 | B2 | 2/2007 | Dalrymple et al. |
| 7,207,387 | B2 | 4/2007 | Eoff et al. |
| 7,216,707 | B2 | 5/2007 | Eoff et al. |
| 7,220,708 | B2 | 5/2007 | Zamora et al. |
| 7,273,099 | B2 | 9/2007 | East, Jr. et al. |
| 2003/0013871 | A1 | 1/2003 | Mallon et al. |
| 2003/0104948 | A1 | 6/2003 | Poelker et al. |
| 2003/0114317 | A1 | 6/2003 | Benton et al. |
| 2003/0166472 | A1 | 9/2003 | Pursley et al. |
| 2003/0191030 | A1 | 10/2003 | Blair et al. |
| 2004/0157749 | A1* | 8/2004 | Ely et al. .................... 507/200 |
| 2004/0171495 | A1 | 9/2004 | Zamora et al. |
| 2004/0220058 | A1 | 11/2004 | Eoff et al. |
| 2004/0229756 | A1 | 11/2004 | Eoff et al. |
| 2004/0229757 | A1 | 11/2004 | Eoff et al. |
| 2005/0155796 | A1 | 7/2005 | Eoff et al. |
| 2005/0164894 | A1 | 7/2005 | Eoff et al. |
| 2005/0194140 | A1 | 9/2005 | Dalrymple et al. |
| 2005/0199396 | A1 | 9/2005 | Sierra et al. |
| 2005/0230114 | A1 | 10/2005 | Eoff et al. |
| 2005/0230116 | A1 | 10/2005 | Eoff et al. |
| 2005/0284632 | A1 | 12/2005 | Dalrymple et al. |
| 2006/0124309 | A1* | 6/2006 | Nguyen et al. ........... 166/308.2 |
| 2006/0137875 | A1 | 6/2006 | Dusterhoft et al. |
| 2006/0234874 | A1 | 10/2006 | Eoff et al. |
| 2006/0240994 | A1 | 10/2006 | Eoff et al. |
| 2006/0266522 | A1 | 11/2006 | Eoff et al. |
| 2006/0283592 | A1 | 12/2006 | Sierra et al. |
| 2007/0012445 | A1 | 1/2007 | Nguyen et al. |
| 2007/0029085 | A1 | 2/2007 | Panga et al. |
| 2007/0029087 | A1 | 2/2007 | Nguyen et al. |
| 2007/0114032 | A1 | 5/2007 | Stegent et al. |
| 2008/0110624 | A1 | 5/2008 | Nguyen et al. |
| 2008/0173451 | A1 | 7/2008 | Reddy |
| 2008/0196897 | A1 | 8/2008 | Nguyen |

FOREIGN PATENT DOCUMENTS

| | | |
|---|---|---|
| EP | 0 383 337 | 8/1990 |
| EP | 0 896 122 | 2/1999 |
| EP | 1 033 378 | 9/2000 |
| EP | 1 193 365 | 4/2002 |
| EP | 1 312 753 | 5/2003 |
| GB | 2 221 940 | 2/1990 |
| GB | 2 335 428 | 9/1999 |
| WO | WO 93/15164 | 8/1993 |
| WO | WO 99/49183 | 9/1999 |
| WO | WO 99/50530 | 10/1999 |
| WO | WO 00/78890 | 12/2000 |
| WO | WO 02/097236 | 12/2002 |
| WO | WO 03/056130 | 7/2003 |
| WO | WO 2004/022667 | 3/2004 |
| WO | WO 2004/094781 | 11/2004 |
| WO | WO 2004/101706 | 11/2004 |
| WO | WO2006/116868 A1 | 11/2006 |

OTHER PUBLICATIONS

Eoff, Larry, et al, *Structure and Process Optimization for the Use of a Polymeric Relative-Permeability Modifier in Conformance Control*, SPE eLibrary Paper No. 64985, 2001, Society of Petroleum Engineers, Inc., presented at SPE International Symposium on Oilfield Chemistry, Houston, TX, Feb. 13-16, pp. 1-2.

Inikori, Solomon Ovueferaye, *Numerical Study of Water Coning Control with Downhole Water Sink (DWS) Well Completions in Vertical and Horizontal Wells*, A Dissertation, Aug. 2002, Title Page, Contents, Abstract and pp. 17-18, Submitted to the Graduate Faculty of the Louisiana State University and Agricultural and Mechanical College, The Department of Petroleum Engineering.

Zhou, Z. J., et al, *Controlling Formation Damage Using Clay Stabilizers: A Review*, Paper 95-71, The Petroleum Society of CIM, 1995, presented at the 46th Annual Technical Meeting of the Petroleum Society of CIM in Banff, Alberta, Canada, May 14-17.

Halliburton, 2001 Press Releases, *Halliburton Technology Uses Revolutionary Polymer System to Control Unwanted Water Production*, 2002 Halliburton, pp. 1-2.

Halliburton, 2001 Press Releases, *First Halliburton H2Zero™ Conformance Solution Job Performed for a Producing Well in Egypt*, 2002 Halliburton, pp. 1-2.

Halliburton, 2001 Press Releases, *Halliburton Performs First H2Zero™ Conformance Solution Job in North America*, 2002 Halliburton, pp. 1-2.

BJ Services Company, *Aquacon, Product Information*, Aug. 1, 2001, pp. 1-2.

BJ Services Company, *Aquatrol I, Product Information*, Dec. 14, 2000, pp. 1-2.

Proett, et al., *Advanced Dual Probe Formation Tester with Transient, Harmonic, and Pulsed Time-Delay Testing Methods Determines Permeability, Skin, and Anisotropy*, SPE 64650, 2000, Society of Petroleum Engineers Inc., presented at the SPE International Oil and Gas Conference and Exhibition in China held in Beijing, China, Nov. 7-10, 2000, printed from website @ http://speonline.spe.org.

Proett, et al., *Advanced Permeability and Anisotropy Measurements While Testing and Sampling in Real-time Using a Dual Probe Formation Tester*, SPE 62919, 2000, Society of Petroleum Engineers Inc., presented at the 2000 SPE Annual Technical Conference and Exhibition held in Dallas, Texas, Oct. 1-4, 2000.

Bai, et al., *Improved Determination of Stress-Dependent Permeability for Anisotropic Formations*, SPE/ISRM 78188, 2000, Society of Petroleum Engineers Inc., presented at the SPE/ISRM Rock Mechanics Conference held in Irving, Texas, Oct. 20-23, 2002.

Parker, et al., *Laser Drilling: Effects of Beam Application Methods on Improving Rock Removal*, SPE 84353, 2003, Society of Petroleum Engineers Inc., presented at the SPE Annual Technical Conference and Exhibition held in Denver, Colorado, Oct. 5-8, 2003.

Xu, et al., *Modeling of Laser Spallation Drilling of Rocks for Gas—and Oilwell Drilling*, SPE 95746, 2005, Society of Petroleum Engineers Inc., presented at the 2005 SPE Annual Technical Conference and Exhibition held in Dallas, Texas, Oct. 9-12, 2005.

Batarseh, et al., *Well Perforation Using High-Power Lasers*, SPE 84418, 2003, Society of Petroleum Engineers Inc., presented at the SPE Annual Technical Conference and Exhibition held in Denver, Colorado, Oct. 5-8, 2003.

Gahan, et al., *Analysis of Efficient High-Power Fiber Lasers for Well Perforation*, SPE 90661, 2004, Society of Petroleum Engineers Inc., presented at the SPE Annual Technical Conference and Exhibition held in Houston, Texas, Sep. 26-29, 2004.

Gahan, et al., *Effect of Downhole Pressure Conditions on High-Power Laser Perforation*, SPE 97093, 2005, Society of Petroleum Engineers, presented at the 2005 SPE Annual Technical Conference and Exhibition held in Dallas, Texas, Oct. 9-12, 2005.

U.S. Appl. No. 12/080,647, filed Apr. 4, 2008.

U.S. Appl. No. 11/655,402, filed Jan. 19, 2007.

U.S. Appl. No. 11/655,403, filed Jan. 19, 2007.

Siltech Corporation, Technical Data Sheet Silquat® J15, Nov. 2004.

Siltech Corporation, Technical Data Sheet Silquat® J2, Nov. 2004.

Siltech Corp, Material Safety Data Sheet for Silquat® J15, Revised Apr. 15, 2005.

Siltech Corp, Material Safety Data Sheet for Silquat® J2, Nov. 1, 2004.

Siltech Corporation, Technical Data Sheet Silquat® A0, Apr. 2005.

Siltech Corp, Material Safety Data Sheet for Silquat® A0, Revised Feb. 1, 2006.

Siltech Corporation, Technical Data Sheet Silquat® D2, Nov. 2004.

Siltech Corp, Material Safety Data Sheet Silquat® D2, Revised Apr. 15, 2005.

Siltech Innovative Silicone Specialties, 2005 Siltech Corporation, Organo functional silicone compounds and related specialties, found at: http://www.siltechcorp.com/index.php?option=com_content&task=view&id=75Uitemid.

Halliburton, Stimulation: GasPerm 1000$^{SM}$ Service, Sep. 2006.

Halliburton, Top Technology Solutions 2007: GasPerm 1000$^{SM}$ Service, Apr. 2007.

Halliburton, Stimulation: AquaStim$^{SM}$ Water Frac Service, Jun. 2007.

Office Action mailed Oct. 9, 2008, for U.S. Appl. No. 11/655,402.

* cited by examiner

METHODS TO ENHANCE GAS PRODUCTION FOLLOWING A RELATIVE-PERMEABILITY-MODIFIER TREATMENT

BACKGROUND

The present invention relates to subterranean treatments and, more particularly, in one or more embodiments, to introducing a water-drainage-rate-enhancing agent into a subterranean formation to enhance gas production following a relative-permeability-modifier treatment to decrease undesired water production.

Hydrocarbon gases (e.g., natural gas) are found in subterranean formations beneath the Earth's surface. To obtain these gases, well bores are drilled into the gas-bearing formations through which the gas is produced to the surface. While gas wells are usually completed in gas-bearing formations, the gas wells may also produce water, for example, due to the water's presence in the producing formation. The higher mobility of the water may allow it to flow into the well bore by way of natural fractures and/or high permeability streaks present in the formation. In addition, because gas is a compressible fluid, the relative permeability to gas is markedly impacted by increasing water saturation. If the water is allowed to flow unrestricted, the water can quickly become the primary fluid flowing through the pore throats, forming what is called a "water block." Over the life of such wells, the ratio of water to gas recovered may be undesirable in view of the cost of producing the water, separating it from the gas, and disposing of it, which can represent a significant economic loss.

To decrease the production of water, gas wells may be treated with polymers, commonly referred to as "relative-permeability modifiers." As used in this disclosure, the term "relative-permeability modifier" refers to a polymer that selectively reduces the effective permeability of a subterranean formation to water. In other words, the relative-permeability modifier should substantially reduce the effective permeability of a treated formation to water without a comparable reduction in the effective permeability of the treated formation to hydrocarbons, for example, gas. Because the relative-permeability modifier reduces the formation's effective permeability to water, the production of water from the treated formation should also be reduced. Moreover, due to the selective reduction in permeability primarily to water, gas production from the treated formation should not be adversely impacted. The use of relative-permeability modifiers to decrease the production of water involves less risk than other techniques which involve porosity fill sealants and has the advantage of not requiring expensive zonal isolation techniques.

Following treatment with the relative-permeability modifiers, a gas (such as nitrogen) may be introduced into the treated formation. It is believed that this gas overflush should enhance subsequent gas production from the formation by increasing the gas saturation near the well bore and, in effect, "charging" the formation near the well bore temporarily which should aid in initiating gas flow and clean up of near well bore water blocks. However, treatment with the gas may be difficult, if not impossible, in certain instances, for example, due to logistical problems.

SUMMARY

The present invention relates to subterranean treatments and, more particularly, in one or more embodiments, to introducing a water-drainage-rate-enhancing agent into a subterranean formation to enhance gas production following a relative-permeability-modifier treatment to decrease undesired water production.

An exemplary embodiment of the present invention provides a method of treating a subterranean formation such that initiation of gas production is enhanced following the treatment. The method comprises introducing a relative-permeability modifier into the subterranean formation such that the relative-permeability modifier reduces permeability of the subterranean formation to aqueous fluids. The method further comprises introducing a water-drainage-rate-enhancing agent into the subterranean formation.

Another exemplary embodiment of the present invention provides a method of treating a subterranean formation with a relative-permeability modifier such that initiation of gas production is enhanced following the treatment. The method comprises introducing a treatment fluid into at least a portion of the subterranean formation. The treatment fluid comprises an aqueous fluid, the relative-permeability modifier in an amount in the range of from about 0.05% to about 1% by weight of the treatment fluid, and a water-drainage-rate-enhancing agent in an amount in the range of from about 0.5% to about 5% by weight of the treatment fluid. The relative-permeability modifier comprises a water-soluble polymer.

Another exemplary embodiment of the present invention provides a method of treating a subterranean formation. The method comprises combining a water-drainage-rate-enhancing agent with a relative-permeability-modifier treatment to decrease water production from the subterranean formation, such that initiation of gas production from the subterranean formation following the relative-permeability-modifier treatment is enhanced.

Another exemplary embodiment of the present invention provides a treatment fluid comprising a carrier fluid, a relative-permeability modifier, and a water-drainage-rate-enhancing agent.

The features and advantages of the present invention will be apparent to those skilled in the art upon reading the following description of specific embodiments with reference to the accompanying drawings.

DRAWINGS

These drawings illustrate certain aspects of the present invention disclosure and should not be used to limit or define the invention.

DESCRIPTION OF SPECIFIC EMBODIMENTS

Figure 1:
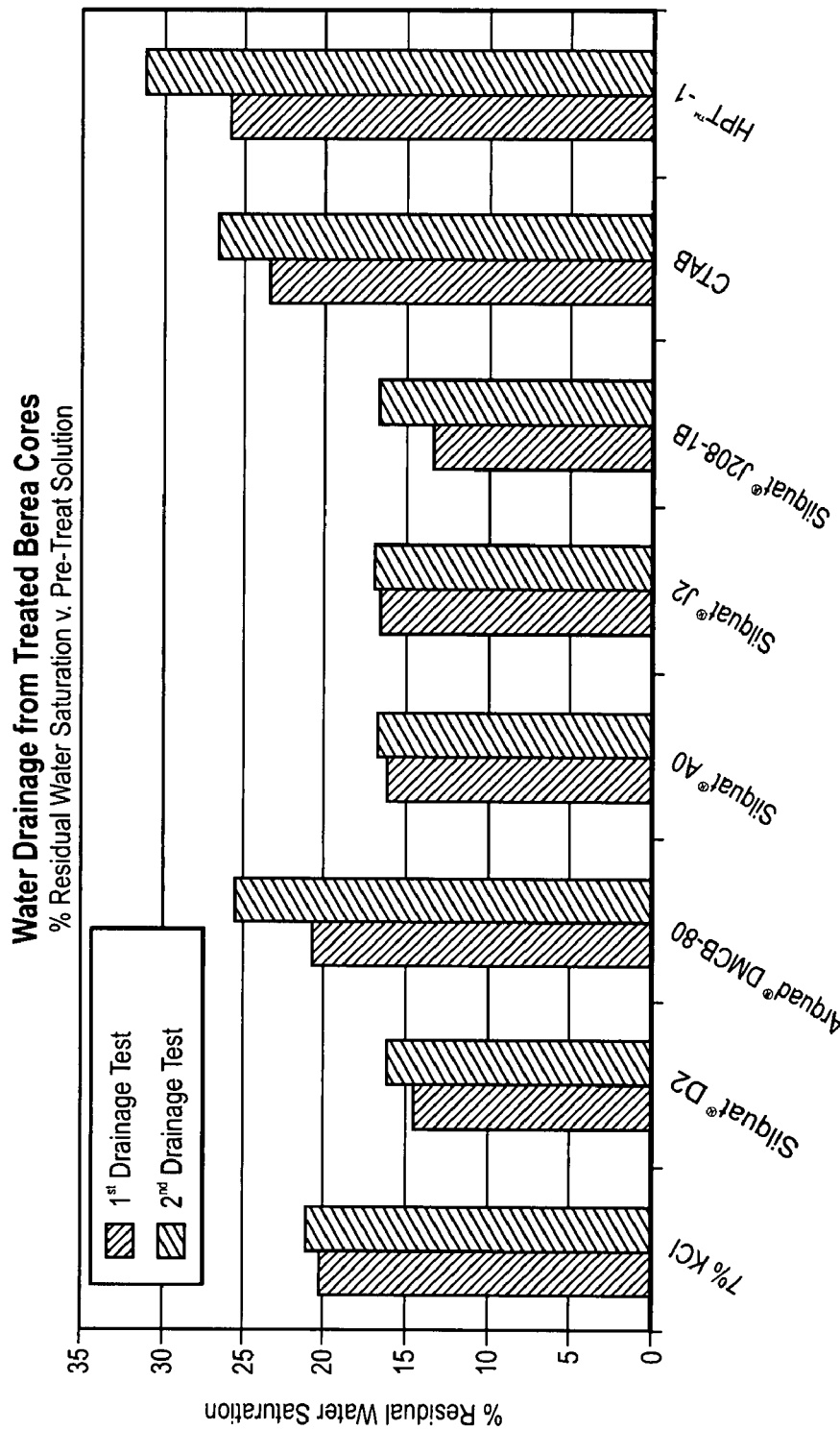
FIG. 1 is a graph of percent residual water saturation for Berea sandstone cores treated with certain materials in a brine-based carrier fluid.

The present invention relates to subterranean treatments and, more particularly, in one or more embodiments, to introducing a water-drainage-rate-enhancing agent into a subterranean formation to enhance gas production following a relative-permeability-modifier treatment to decrease undesired water production.

Exemplary Methods

As will be appreciated by those of ordinary skill in the art, exemplary embodiments of the present invention may be used in any subterranean formation containing gas in which a relative-permeability-modifier treatment to reduce water production is desired. This gas may be compressed gas contained within formation pores and/or gas that is adsorbed onto surfaces within the formation. By way of example, the techniques described in this disclosure may be used to treat low-pressure gas wells to enhance gas production, following a relative-permeability-modifier treatment. As used in this disclosure, the term "low-pressure gas well" generally refers to a well that does not have sufficient bottom hole reservoir pressure to flow against a column of water. If the hydrostatic pressure caused by the water in the well bore is higher than the reservoir pressure in the gas-producing zone, the water will crossflow into the gas-producing zone. It would be desirable to prevent or reduce the inflow of water into the well bore so that gas production can be achieved. Once gas is flowing into the well bore, it will reduce the hydrostatic pressure and thus increase the drawdown on the well.

Water production is one problem that is often encountered in gas wells. To reduce the production of water in a gas well, a relative-permeability-modifier treatment may be performed, in accordance with one or more embodiments of the present invention. In exemplary embodiments, a relative-permeability-modifier treatment may include introducing a relative-permeability modifier into at least a portion of the subterranean formation. As described above, the relative-permeability modifier should substantially reduce the effective permeability of the portion to water without a comparable reduction of the portion's effective permeability to hydrocarbons. It is believed that the relative-permeability modifier attaches (e.g., adsorbs) to surfaces within the portion of the subterranean formation, thereby reducing the portion's effective permeability to water. Because the relative-permeability modifier reduces the formation's effective permeability to water, the production of water from the treated formation should be reduced. In this manner, the relative-permeability modifier treatment may be used to control water production in gas wells. Exemplary relative-permeability modifiers that may be used in accordance with exemplary embodiments of the present invention are described in more detail below.

The portion of the subterranean formation into which the relative-permeability modifier is introduced may be any portion of the subterranean formation wherein the reduction of water production is desired. For example, the gas well may be a producing well from which the undesired production of water is occurring, wherein the relative-permeability modifier may be introduced into at least a portion of the subterranean formation from which the water is being produced. In certain embodiments, the portion may be a gas-producing zone through which undesired water production is occurring. In certain embodiments, the portion may be a water-bearing zone, for example, that may be adjacent to the producing zone. In one exemplary embodiment, the subterranean formation may contain a low-permeability, gas-producing zone and a high-permeability, water-producing zone. A low-permeability zone may have a permeability, for example, of less than 0.1 millidarcies. A high-permeability zone may have a permeability, for example, of greater than 100 millidarcies. In accordance with exemplary embodiments of the present invention, the relative-permeability modifier may be introduced into the water-producing zone. As will be appreciated, the relative-permeability modifier should generally enter all exposed areas that will accept fluid, such that some of the relative-permeability modifier may also enter the gas-producing zone, for example.

Any suitable technique may be used for the introduction of the relative-permeability modifier into the portion of the subterranean formation. For example, bull heading, coiled tubing, jointed pipe (e.g., with straddle packers, jetting tools, etc.), or any other suitable technique may be used. In certain exemplary embodiments, a treatment fluid containing water (such as freshwater, saltwater, brine, seawater, etc.) and the relative-permeability modifier may be introduced into the portion. For example, the treatment fluid may be bullheaded into the portion of the subterranean formation. The relative-permeability modifier should be included in the treatment fluid in an amount sufficient to provide the desired water control. For example, the relative-permeability modifier may be present in an amount in the range of from about 0.02% to about 10% by weight of the treatment fluid. By way of further example, the relative-permeability modifier may be present in an amount in the range of from about 0.05% to about 1% by weight of the treatment fluid.

After the relative-permeability-modifier treatment, the gas well may be placed into production. However, after the relative-permeability-modifier treatment, the desired initiation of the gas production may not be achieved. While it is believed that the gas well should, with time, meet or exceed gas-production rates from prior to the treatment, the gas production may not be initiated as desired. A number of factors may contribute to the potential problems with the initiation of gas production, following the relative-permeability-modifier treatment. For example, water from the relative-permeability-modifier treatment may enter the gas-producing zone, resulting in potential water blocks that may reduce the effective permeability of the formation. In addition, while the relative-permeability modifier selectively reduces water permeability, there may be a slight reduction in hydrocarbon permeability as well.

To enhance the production of gas following the relative-permeability-modifier treatment, a water-drainage-rate-enhancing agent may be introduced into at least a portion of the subterranean formation. As used in this disclosure, the term "water-drainage-rate-enhancing agent" refers to a material that should improve water-drainage rates from a treated formation with respect to a formation that has not been treated with the material. By using the water-drainage-rate-enhancing agent with the relative-permeability-modifier treatment it is believed that the initiation of gas production may be accelerated. In general, the water-drainage-rate-enhancing agent should reduce the occurrence of water blocks in the treated portion of the formation. The term "water block" commonly refers to a production impairment that can occur when the formation matrix in the near-well-bore area becomes water saturated, thereby decreasing the relative permeability to hydrocarbons. A water block may result, for example, from the invasion of water-based drilling or completion fluids or from fingering or coning of formation water. It is believed that the water-drainage-rate-enhancing agent should reduce capillary pressures in the porosity of the formation thereby leading to increased water-drainage rates. As will be appreciated, increased water-drainage rates should allow a reduction in existing water blocks, as well as a reduction in the formation of water blocks. Exemplary relative-permeability modifiers that may be used in accordance with exemplary embodiments of the present invention are described in more detail below.

The portion of the subterranean formation into which the water-drainage-rate-enhancing agent may be introduced generally includes any portion or all of the subterranean formation in which the relative-permeability-modifier treatment was performed. For example, the portion treated with the water-drainage-rate-enhancing agent may be the same, or different, than the portion treated with the relative-permeability modifier. In certain exemplary embodiments, the water-drainage-rate-enhancing agent may be introduced into the gas-producing zone in the formation. As described above, this gas-producing zone may have been treated with the relative-permeability modifier to reduce water production therethrough. In one exemplary embodiment, the subterranean formation may contain a low-permeability, gas-producing zone and a high-permeability, water-producing zone. In accordance with exemplary embodiments, the relative-permeability modifier may be introduced into the water-producing zone. As will be appreciated, some of the relative-permeability modifier may also enter the gas-producing zone. Accordingly, in certain embodiments, the water-drainage-rate-enhancing agent may be introduced into the gas-producing zone. As will be appreciated, some of the water-drainage-rate-enhancing agent may also enter the water-producing zone.

Any suitable technique may be used for the introduction of the water-drainage-rate-enhancing agent into the portion of the subterranean formation. For example, bull heading, coiled tubing, jointed pipe (e.g., with straddle packers, jetting tools, etc.), or any other suitable technique may be used. In certain exemplary embodiments, a treatment fluid containing a carrier fluid and the water-drainage-rate-enhancing agent may be introduced into the portion. For example, the treatment fluid may be bullheaded into the portion of the subterranean formation. Suitable carrier fluids include water (e.g., freshwater, saltwater, brine, seawater), non-aqueous fluids (e.g., oxygenated solvents, hydrocarbon solvents, etc.), and combinations thereof. An example of a suitable non-aqueous fluid includes oxygenated solvents, such as alcohols, glycols, esters, ethers, and combinations thereof. An alcohol (such as methanol) may be used as the carrier fluid, for example, when treating a coal bed. Another example of a suitable non-aqueous fluid includes a hydrocarbon solvent, such as gasoline, kerosene, toluene, xylene, alpha-olefins and mineral oils. The water-drainage-rate-enhancing agent should be included in the treatment fluid in an amount sufficient to provide the desired treatment. For example, the water-drainage-rate-enhancing agent may be present in an amount in the range of from about 0.1% to about 10% by weight of the treatment fluid. By way of further example, the water-drainage-rate-enhancing agent may be present in an amount in the range of from about 0.5% to about 5% by weight of the treatment fluid.

While the preceding discussion has described treatment of the formation with the water-drainage-rate-enhancing agent as following the relative-permeability-modifier treatment, it should be understood that the water-drainage-rate-enhancing agent may be combined with the relative-permeability-modifier treatment, provided that the components are compatible with one another (for example, no undesirable precipitation upon mixing) and do not detrimentally effect each other's intended function. For example, the treatment fluid may include water, the relative-permeability modifier, and the water-drainage-rate-enhancing agent. In this embodiment, a single treatment fluid may be used to control water production from the gas well and enhance gas production following the relative-permeability-modifier treatment.

Exemplary Relative-Permeability Modifiers

As described above, a relative-permeability modifier may be introduced into at least a portion of a subterranean formation, in accordance with exemplary embodiments of the present invention. In general, suitable relative-permeability modifiers may be any of a variety of compounds that are capable of selectively reducing the effective permeability of a formation to water without a comparable reduction of the formation's effective permeability to hydrocarbons. Suitable relative-permeability modifiers generally include water-soluble polymers that attach to surfaces within the formation, reducing the water permeability without a comparable reduction in hydrocarbon permeability.

Those of ordinary skill in the art will appreciate that a variety of different water-soluble polymers may be suitable for use as the relative-permeability modifiers. Examples of suitable water-soluble polymers include homo-, co-, and terpolymers of acrylamide, 2-acrylamido-2-methyl propane sulfonic acid, N,N-dimethylacrylamide, vinyl pyrrolidone, dimethylaminoethyl methacrylate, acrylic acid, dimethylaminopropylmethacrylamide, vinyl amine, vinyl acetate, trimethylammoniumethyl methacrylate chloride, methacrylamide, hydroxyethyl acrylate, vinyl sulfonic acid, vinyl phosphonic acid, methacrylic acid, vinyl caprolactam, N-vinylformamide, N,N-diallylacetamide, dimethyldiallyl ammonium halide, itaconic acid, styrene sulfonic acid, methacrylamidoethyltrimethyl ammonium halide, quaternary salt derivatives of acrylamide quaternary salt derivatives of acrylic acid, and combinations thereof.

In addition, water-soluble polymers suitable for use as relative-permeability modifiers also may include hydrophobically modified polymers. As used in this disclosure, the terms "hydrophobically modified," "hydrophobic modification," and the like refer to the incorporation into the hydrophilic polymer structure of hydrophobic groups, wherein the alkyl chain length is about 4 to about 22 carbons. While these hydrophobically modified polymers have hydrophobic groups incorporated into the hydrophilic polymer structure, they should remain water-soluble. In some embodiments, a mole ratio of a hydrophilic monomer to the hydrophobic compound in the hydrophobically modified polymer is in the range of from about 99.98:0.02 to about 90:10, wherein the hydrophilic monomer is a calculated amount present in the hydrophilic polymer. In certain embodiments, the hydrophobically modified polymers may comprise a polymer backbone that comprises polar heteroatoms. Generally, the polar heteroatoms present within the polymer backbone of the hydrophobically modified polymers include, but are not limited to, oxygen, nitrogen, sulfur, or phosphorous.

Exemplary hydrophobically modified polymers may contain a hydrophilic polymer backbone and a hydrophobic branch, wherein the hydrophobic branch includes an alkyl chain of about 4 to about 22 carbons. In certain exemplary embodiments, the hydrophobic branch may have an alky chain length of about 7 to about 22 carbons. In certain exemplary embodiments, the hydrophobic branch may have an alkyl chain length of about 12 to about carbons.

Examples of suitable hydrophobically modified polymers that may be utilized include acrylamide/octadecyldimethylammoniumethyl methacrylate bromide copolymer, dimethylaminoethyl methacrylate/vinyl pyrrolidone/hexadecyldimethylammoniumethyl methacrylate bromide terpolymer, and acrylamide/2-acrylamido-2-methyl propane sulfonic acid/2-ethylhexyl methacrylate terpolymer. Another example of a suitable hydrophobically modified polymer comprises an amino methacrylate/alkyl amino methacrylate copolymer. An example of a suitable amino methacrylate/alkyl amino methacrylate copolymer includes a dimethlyaminoethyl methacrylate/alkyl-dimethylammoniumethyl methacrylate copolymer. An example of a suitable dimethlyaminoethyl methacrylate/alkyl-dimethylammoniumethyl methacrylate copolymer includes a dimethylaminoethyl methacrylate/hexadecyl-dimethylammoniumethyl methacrylate copolymer. As discussed in more detail below, these copolymers may be formed, in exemplary embodiments, by reactions with a variety of alkyl halides. For example, in some exemplary embodiments, the hydrophobically modified polymer may comprise a dimethylaminoethyl methacrylate/hexadecyl-dimethylammoniumethyl methacrylate bromide copolymer.

Exemplary hydrophobically modified polymers may be synthesized utilizing any suitable technique. For example, the hydrophobically modified polymers may be a reaction product of one or more hydrophilic polymers and one or more hydrophobic compounds. By way of further example, the hydrophobically modified polymers may be prepared from a polymerization reaction comprising a hydrophilic monomer and a hydrophobically modified hydrophilic monomer. In exemplary embodiments, the hydrophobically modified polymers may be pre-reacted before they are placed into the well bore. Alternatively, in exemplary embodiments, the hydrophobically modified polymers may be prepared by an appropriate in situ reaction. Suitable hydrophobically modified polymers and methods for their preparation are described in more detail in U.S. Pat. Nos. 6,476,169 and 7,117,942, the disclosures of which are incorporated herein by reference. Those of ordinary skill in the art, with the benefit of this disclosure, will be able to determine other suitable methods for the synthesis of suitable hydrophobically modified polymers.

In certain exemplary embodiments, suitable hydrophobically modified polymers may be synthesized by the hydrophobic modification of a hydrophilic polymer via reaction with a hydrophobic compound. As described above, hydrophobic modification refers to incorporation into the hydrophilic polymer structure of hydrophobic groups, wherein the alkyl chain length is from about 4 to about 22 carbons. The hydrophilic polymers suitable for forming the hydrophobically modified polymers used in the present invention should be capable of reacting with hydrophobic compounds. Suitable hydrophilic polymers include, homo-, co-, or terpolymers such as, but not limited to, polyacrylamides, polyvinylamines, poly(vinylamines/vinyl alcohols), alkyl acrylate polymers in general, and combinations thereof. Additional examples of alkyl acrylate polymers include polydimethylaminoethyl methacrylate, polydimethylaminopropyl methacrylamide, poly(acrylamide/dimethylaminoethyl methacrylate), poly(methacrylic acid/dimethylaminoethyl methacrylate), poly(2-acrylamido-2-methyl propane sulfonic acid/dimethylaminoethyl methacrylate), poly(acrylamide/dimethylaminopropyl methacrylamide), poly (acrylic acid/dimethylaminopropyl methacrylamide), poly(methacrylic acid/dimethylaminopropyl methacrylamide), and combinations thereof. In certain exemplary embodiments, the hydrophilic polymers comprise a polymer backbone and reactive amino groups in the polymer backbone or as pendant groups, the reactive amino groups capable of reacting with hydrophobic compounds. In some exemplary embodiments, the hydrophilic polymers comprise dialkyl amino pendant groups. In some exemplary embodiments, the hydrophilic polymers comprise a dimethyl amino pendant group and a monomer comprising dimethylaminoethyl methacrylate or dimethylaminopropyl methacrylamide. In certain exemplary embodiments, the hydrophilic polymers comprise a polymer backbone that comprises polar heteroatoms, wherein the polar heteroatoms present within the polymer backbone of the hydrophilic polymers include oxygen, nitrogen, sulfur, or phosphorous. Suitable hydrophilic polymers that comprise polar heteroatoms within the polymer backbone include homo-, co-, or terpolymers, such as, but not limited to, celluloses, chitosans, polyamides, polyetheramines, polyethyleneimines, polyhydroxyetheramines, polylysines, polysulfones, gums, starches, and combinations thereof. In one exemplary embodiment, the starch is a cationic starch. A suitable cationic starch may be formed by reacting a starch, such as corn, maize, waxy maize, potato, tapioca, or the like, with the reaction product of epichlorohydrin and trialkylamine.

The hydrophobic compounds that are capable of reacting with the hydrophilic polymers include alkyl halides, sulfonates, sulfates, organic acids, and organic acid derivatives. Examples of suitable organic acids and derivatives thereof include octenyl succinic acid; dodecenyl succinic acid; and anhydrides, esters, imides, and amides of octenyl succinic acid or dodecenyl succinic acid. In certain exemplary embodiments, the hydrophobic compounds may have an alkyl chain length of from about 4 to about 22 carbons. In another exemplary embodiment, the hydrophobic compounds may have an alkyl chain length of from about 7 to about 22 carbons. In another exemplary embodiment, the hydrophobic compounds may have an alkyl chain length of from about 12 to about 18 carbons. For example, where the hydrophobic compound is an alkyl halide, the reaction between the hydrophobic compound and hydrophilic polymer may result in the quaternization of at least some of the hydrophilic polymer amino groups with an alkyl halide, wherein the alkyl chain length is from about 4 to about 22 carbons.

As previously mentioned, in certain exemplary embodiments, suitable hydrophobically modified polymers also may be prepared from a polymerization reaction comprising a hydrophilic monomer and a hydrophobically modified hydrophilic monomer. The hydrophobically modified polymers synthesized from the polymerization reactions may have estimated molecular weights in the range of from about 100,000 to about 10,000,000 and mole ratios of the hydrophilic monomer(s) to the hydrophobically modified hydrophilic monomer(s) in the range of from about 99.98:0.02 to about 90:10.

A variety of hydrophilic monomers may be used to form the hydrophobically modified polymers useful in the present invention. Examples of suitable hydrophilic monomers include acrylamide, 2-acrylamido-2-methyl propane sulfonic acid, N,N-dimethylacrylamide, vinyl pyrrolidone, dimethylaminoethyl methacrylate, acrylic acid, dimethylaminopropylmethacrylamide, vinyl amine, vinyl acetate, trimethylammoniumethyl methacrylate chloride, methacrylamide, hydroxyethyl acrylate, vinyl sulfonic acid, vinyl phosphonic acid, methacrylic acid, vinyl caprolactam, N-vinylformamide, N,N-diallylacetamide, dimethyldiallyl ammonium halide, itaconic acid, styrene sulfonic acid, methacrylamidoethyltrimethyl ammonium halide, quaternary salt derivatives of acrylamide, quaternary salt derivatives of acrylic acid, and combinations thereof.

A variety of hydrophobically modified hydrophilic monomers also may be used to form the hydrophobically modified polymers useful in exemplary embodiments of the present invention. Examples of suitable hydrophobically modified hydrophilic monomers include alkyl acrylates, alkyl methacrylates, alkyl acrylamides, alkyl methacrylamides alkyl dimethylammoniumethyl methacrylate halides, and alkyl dimethylammoniumpropyl methacrylamide halides, wherein the alkyl groups have from about 4 to about 22 carbon atoms. In another exemplary embodiment, the alkyl groups have from about 7 to about 22 carbons. In another exemplary embodiment, the alkyl groups have from about 12 to about 18 carbons. In certain exemplary embodiments, the hydrophobically modified hydrophilic monomer comprises octadecyldimethylammoniumethyl methacrylate bromide, hexadecyldimethylammoniumethyl methacrylate bromide, hexadecyldimethylammoniumpropyl methacrylamide bromide, 2-ethylhexyl methacrylate, or hexadecyl methacrylamide.

In addition, water-soluble polymers suitable for use as relative-permeability modifiers also may include hydrophilically modified polymers. As used in this disclosure, the terms "hydrophilic modification," "hydrophilically modified," and the like refer to the incorporation into the hydrophilic polymer structure of hydrophilic groups, such as to introduce branching or to increase the degree of branching in the hydrophilic polymer. The hydrophilically modified polymers of the present invention typically have molecular weights in the range of from about 100,000 to about 10,000,000. In certain embodiments, the hydrophilically modified polymers comprise a polymer backbone, the polymer backbone comprising polar heteroatoms. Generally, the polar heteroatoms present within the polymer backbone of the hydrophilically modified polymers include, but are not limited to, oxygen, nitrogen, sulfur, or phosphorous.

The hydrophilically modified polymers may be synthesized using any suitable method. In one example, the hydrophilically modified polymers may be a reaction product of a hydrophilic polymer and a hydrophilic compound. In certain exemplary embodiments, suitable hydrophilically modified polymers may be formed by additional hydrophilic modification, for example, to introduce branching or to increase the degree of branching, of a hydrophilic polymer. Those of ordinary skill in the art, with the benefit of this disclosure, will be able to determine other suitable methods for the preparation of suitable hydrophilically modified polymers.

The hydrophilic polymers suitable for forming the hydrophilically modified polymers used in exemplary embodiments should be capable of reacting with hydrophilic compounds. In certain exemplary embodiments, suitable hydrophilic polymers include, homo-, co-, or terpolymers, such as, but not limited to, polyacrylamides, polyvinylamines, poly(vinylamines/vinyl alcohols), and alkyl acrylate polymers in general. Additional examples of alkyl acrylate polymers include, but are not limited to, polydimethylaminoethyl methacrylate, polydimethylaminopropyl methacrylamide, poly(acrylamide/dimethylaminoethyl methacrylate), poly(methacrylic acid/dimethylaminoethyl methacrylate), poly(2-acrylamido-2-methyl propane sulfonic acid/dimethylaminoethyl methacrylate), poly(acrylamide/dimethylaminopropyl methacrylamide), poly(acrylic acid/dimethylaminopropyl methacrylamide), and poly(methacrylic acid/dimethylaminopropyl methacrylamide). In certain exemplary embodiments, the hydrophilic polymers comprise a polymer backbone and reactive amino groups in the polymer backbone or as pendant groups, the reactive amino groups capable of reacting with hydrophilic compounds. In some exemplary embodiments, the hydrophilic polymers comprise dialkyl amino pendant groups. In some exemplary embodiments, the hydrophilic polymers comprise a dimethyl amino pendant group and at least one monomer comprising dimethylaminoethyl methacrylate or dimethylaminopropyl methacrylamide. In other exemplary embodiments, the hydrophilic polymers comprise a polymer backbone comprising polar heteroatoms, wherein the polar heteroatoms present within the polymer backbone of the hydrophilic polymers include, but are not limited to, oxygen, nitrogen, sulfur, or phosphorous. Suitable hydrophilic polymers that comprise polar heteroatoms within the polymer backbone include homo-, co-, or terpolymers, such as, but not limited to, celluloses, chitosans, polyamides, polyetheramines, polyethyleneimines, polyhydroxyetheramines, polylysines, polysulfones, gums, starches, and derivatives thereof. In one embodiment, the starch is a cationic starch. A suitable cationic starch may be formed by reacting a starch, such as corn, maize, waxy maize, potato, tapioca, and the like, with the reaction product of epichlorohydrin and trialkylamine.

Hydrophilic compounds suitable for reaction with the hydrophilic polymers include: polyethers that comprise halogens; sulfonates; sulfates; organic acids; and organic acid derivatives. Examples of suitable polyethers include, but are not limited to, polyethylene oxides, polypropylene oxides, and polybutylene oxides, and copolymers, terpolymers, and mixtures thereof. In some exemplary embodiments, the polyether comprises an epichlorohydrin-terminated polyethylene oxide methyl ether.

The hydrophilically modified polymers formed from the reaction of a hydrophilic polymer with a hydrophilic compound may have estimated molecular weights in the range of from about 100,000 to about 10,000,000 and may have weight ratios of the hydrophilic polymers to the polyethers in the range of from about 1:1 to about 10:1. Examples of suitable hydrophilically modified polymers having molecular weights and weight ratios in the ranges set forth above include, but are not limited to, the reaction product of polydimethylaminoethyl methacrylate and epichlorohydrin-terminated polyethyleneoxide methyl ether; the reaction product of polydimethylaminopropyl methacrylamide and epichlorohydrin-terminated polyethyleneoxide methyl ether; and the reaction product of poly(acrylamide/dimethylaminopropyl methacrylamide) and epichlorohydrin-terminated polyethyleneoxide methyl ether. In some embodiments, the hydrophilically modified polymer comprises the reaction product of a polydimethylaminoethyl methacrylate and epichlorohydrin-terminated polyethyleneoxide methyl ether having a weight ratio of polydimethylaminoethyl methacrylate to epichlorohydrin-terminated polyethyleneoxide methyl ether of about 3:1.

Exemplary Water-Drainage-Rate-Enhancing Agents

As described above, a water-drainage-rate-enhancing agent may be introduced into at least a portion of a subterranean formation, in accordance with exemplary embodiments of the present invention. The water-drainage-rate-enhancing agent may be introduced into the formation with, or separate from, the relative-permeability modifier. In addition, the water-drainage-rate-enhancing agent may be introduced into the same or a different portion of the formation than the relative-permeability modifier.

Any of a variety of different compounds suitable for improving water-drainage rates from a subterranean formation may be used in accordance with exemplary embodiments of the present invention. Examples of suitable water-drainage-rate-enhancing agents include a variety of surfactants, including zwitterionic surfactants, cationic surfactants, nonionic surfactants, and combinations thereof. Examples of suitable zwitterionic surfactants include organic surfactants that include an alkyl chain length of about 12 to about 22 carbons, a cationic group and an anionic group. Examples of suitable cationic surfactants include organic surfactants that include an alkyl chain length of about 12 to about 22 carbons and a cationic group. An additional example of a suitable water-drainage-rate-enhancing agent includes a solvent-surfactant blend that includes a solvent, a surfactant and an alcohol.

As described above, cationic surfactants are an example of suitable water-drainage-rate-enhancing agents. One example of a suitable cationic surfactant includes a cationic polyorganosiloxanes comprising at least two quaternary ammonium groups. As used in this disclosure, the term "polyorganosiloxane" refers to a polymer containing a polymer backbone of Si—O—Si bonds, wherein the silicon atoms in the polymer backbone are connected to alkyl groups via Si—C bonds except at the chain ends and branching points where the silicon atoms may be connected to either carbon or other atoms such as oxygen, nitrogen, sulfur, and the like. The quaternary ammonium groups may be present on the pendant groups (see Structure 1 below) or at the chain ends of the organosiloxane polymer chains (see Structure 2 below). The number of quaternary groups per chain of the organosiloxane is preferably at least two, and may range from 2 to 150 or from 2 to 70. In some exemplary embodiments, about 10% of silicon atoms in the polymer chain carry quaternary ammonium groups. The molecular weights of the polymers may be in the range of from about 1,000 to about 150,000. In some exemplary embodiments of the present invention, the molecular weights of the polymers may range from about 1,500 to about 50,000.

While a wide variety of polyorganosiloxanes may be suitable for use with the present invention, an exemplary embodiment of a cationic polyorganosiloxane comprises polydimethysiloxane comprising at least two quaternary ammonium groups. Exemplary quaternary ammonium groups may comprise dialkyl methyl quaternary ammonium groups. The alkyl group of the dialkyl methyl quaternary ammonium groups may contain from about 1 to about 18 carbons. Another example of a suitable quaternary ammonium group comprises two hydroxyalkyl groups and a methyl group. Examples of suitable hydroxyalkyl groups include hydroxyethyl and hydroxypropyl groups. One such example is SILQUAT 0283A silicone quat, an experimental product from Siltech Corporation which contains methyl dihydroxyethyl quaternary ammonium groups. Another example of suitable quaternary ammonium group comprises amide in one or more of the substituents on the quaternary nitrogen atom (see Structure 3 below). Examples of such materials include SILQUAT AC silicone quat and SILQUATE AD silicone quat available from SilTech Corporation. In one embodiment, the cationic polyorganosiloxane comprises a polydimethylsiloxane. Exemplary polydimethylsiloxanes that comprise dialkyl quaternary ammonium group are commercially available from Siltech Corporation, Toronto, Ontario, Canada, including SILQUAT AO silicone quat, SILQUAT D2 silicone quat, SILQUAT AO silicone quat, SILQUAT J2 silicone quat, and SILQUAT J15 silicone quat. The cationic polydimethylsiloxanes from Siltech Corporation are generally provided as about 70% by weight active solutions of the cationic polydimethylsiloxane in hexylene glycol, dipropylene glycol or isopropyl alcohol or they may be completely solvent free. The solubility of the polymers in water or organic solvents is generally determined by the number of branching, chain length, polar groups, for example hydroxyl, ester or ether groups on the pendant or chain end groups, and the functional groups attached to the quaternary ammonium nitrogen.

By way of example, a suitable cationic polydimethylsiloxane comprising at least two quaternary ammonium groups may have the structure shown below:

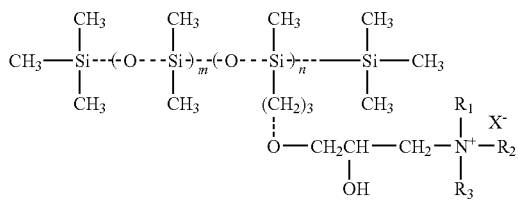

Structure 1 wherein $R_1$ and $R_2$ are independently alkyl groups comprising 1 to 18 carbons, or hydroxyalkyl groups such as hydroxyethyl or hydroxypropyl groups, $R_3$ is a methyl group, n is an integer from 2 to 150, m is an integer from 20 to 2,000, and $X^-$ is a compatible anion, such as fluoride, chloride, bromide, iodide, nitrate, or nitrite.

By way of example, another suitable polydimethylsiloxane comprising at least two dialkyl quaternary ammonium groups may have the structure shown below:

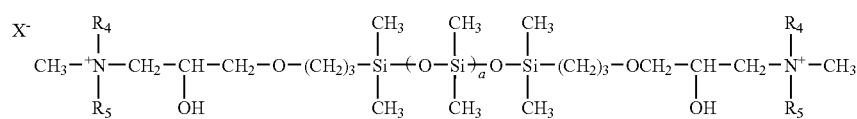

Structure 2 wherein $R_4$ and $R_5$ are independently alkyl groups comprising 1 to 18 carbons, or hydroxyalkyl groups such as hydroxyethyl or hydroxypropyl groups, a is an integer in the range of from 10 to 2,000, and $X^-$ is a compatible anion, such as fluoride, chloride, bromide, iodide, nitrate, or nitrite.

By way of example, another suitable polydimethylsiloxane comprising at least two dialkyl quaternary ammonium groups may have the structure shown below:

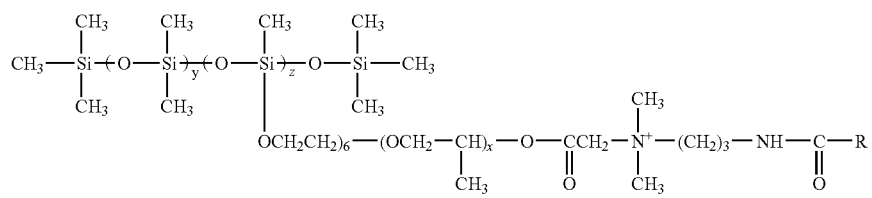

Structure 3 wherein R is an alkyl group comprising 1 to 18 carbons, or a hydroxyalkyl group such as a hydroxyethyl or hydroxypropyl group, x is an integer from 2 to 150, y is an integer from 10 to 2,000, z is an integer from 10 to 2,000, and $X^-$ is a compatible anion, such as fluoride, chloride, bromide, iodide, nitrate, or nitrite.

As described above nonionic surfactants are examples of suitable water-drainage-rate-enhancing agents. Examples of suitable nonionic surfactants include (a) organic surfactants having the structure shown below:

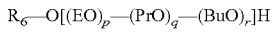

Structure 4 wherein $R_6$ is an alcohol, phenol or phenol derivative or a fatty acid comprising 12 to 22 carbons, EO is an ethylene oxide radical, p is 1 to 20, PrO is a propylene oxide radical, q is 0 to 15, BuO is a butylene oxide radical, and r is 0 to 15; (b) organic polyethylene carbons having the structure shown below:

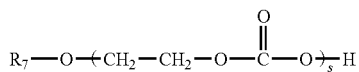

Structure 5 wherein $R_7$ is an alcohol comprising 7 to 16 carbons and s is 7 to 16; (c) butoxylated glycols comprising 1 to 15 butylene oxide groups; and (d) ethoxylated-butoxylated glycols comprising 1 to 5 ethylene oxide groups and 5 to 10 buytylene oxide group. Another example of a suitable nonionic surfactant includes a mixture of alcohols and an ethoxylated nonyl phenol. An example of a suitable nonionic surfactant is PEN 88 additive, available from Halliburton Energy Services, Inc.

As described above, a solvent-surfactant blend is an example of a suitable water-drainage-rate-enhancing agent. In general, the solvent-surfactant blend includes a solvent, a surfactant and an alcohol. Examples of suitable solvents include: terpenes, such as monoterpenes (e.g., d-limonene) and diterpenes; alkyl, cyclic and aryl acid esters of short chain alcohols, such as ethyl lactate and hexyl ester; and combinations thereof. The surfactant included in the solvent-surfactant blend should be selected such that a microemulsion is formed upon combination of the solvent-surfactant blend with a carrier fluid. For example, if the carrier fluid is oil based, the surfactant should be capable of creating a water-in-oil microemulsion upon combination with the carrier fluid. Examples of suitable surfactants for creating the water-in-oil microemulsion may have an HLB (hydrophile-lipophile balance) value of about 3 to about 8. By way of further example, if the carrier fluid is water based, the surfactant should be capable of creating an oil-in-water microemulsion upon combination with the carrier fluid. Examples of suitable surfactants for creating the oil-in-water microemulsion may have an HLB value of about 8 to about 18. Examples of suitable solvent-surfactant blends, including their compositions, preparation, and combination with a carrier fluid to form a microemulsion are described in more detail in U.S. Pat. Pub. No. 2003/0166472, the disclosure of which is incorporated herein by reference. An example of a suitable solvent-surfactant blend is GASPERM 1000, available from Halliburton Energy Services, Inc.

To facilitate a better understanding of the present technique, the following examples of some specific embodiments are given. In no way should the following examples be read to limit, or to define, the scope of the invention.

EXAMPLE 1

A series of tests was performed to analyze the effects of a variety of materials on the water-imbibition and water-drainage rates of sandstone cores using a water-based carrier fluid. The treatment fluids used in this series of tests comprised 1.0% wt/vol of the tested material in a 7% potassium chloride solution, except for HPT-1 chemical additive, which was used in an amount of 0.2% wt/vol. For a control, tests were also performed with only the potassium chloride solution itself.

These tests were performed using high permeability (200-300 millidarcy) Berea sandstone cores in accordance with the following procedure. The Berea sandstone cores measured about 1 inch in diameter and about 2.8-3.3 inches in length. First, a dry core was vacuum saturated with the treatment fluid for four hours. It was determined that the core was fully saturated with the treatment fluid when no air bubbles could be seen exiting the core. The core was then weighed to determine the saturated core weight. Using the density of the carrier fluid, the pore volume of the core was determined based on the difference between the saturated core weight and the unsaturated core weight.

Figure 2:
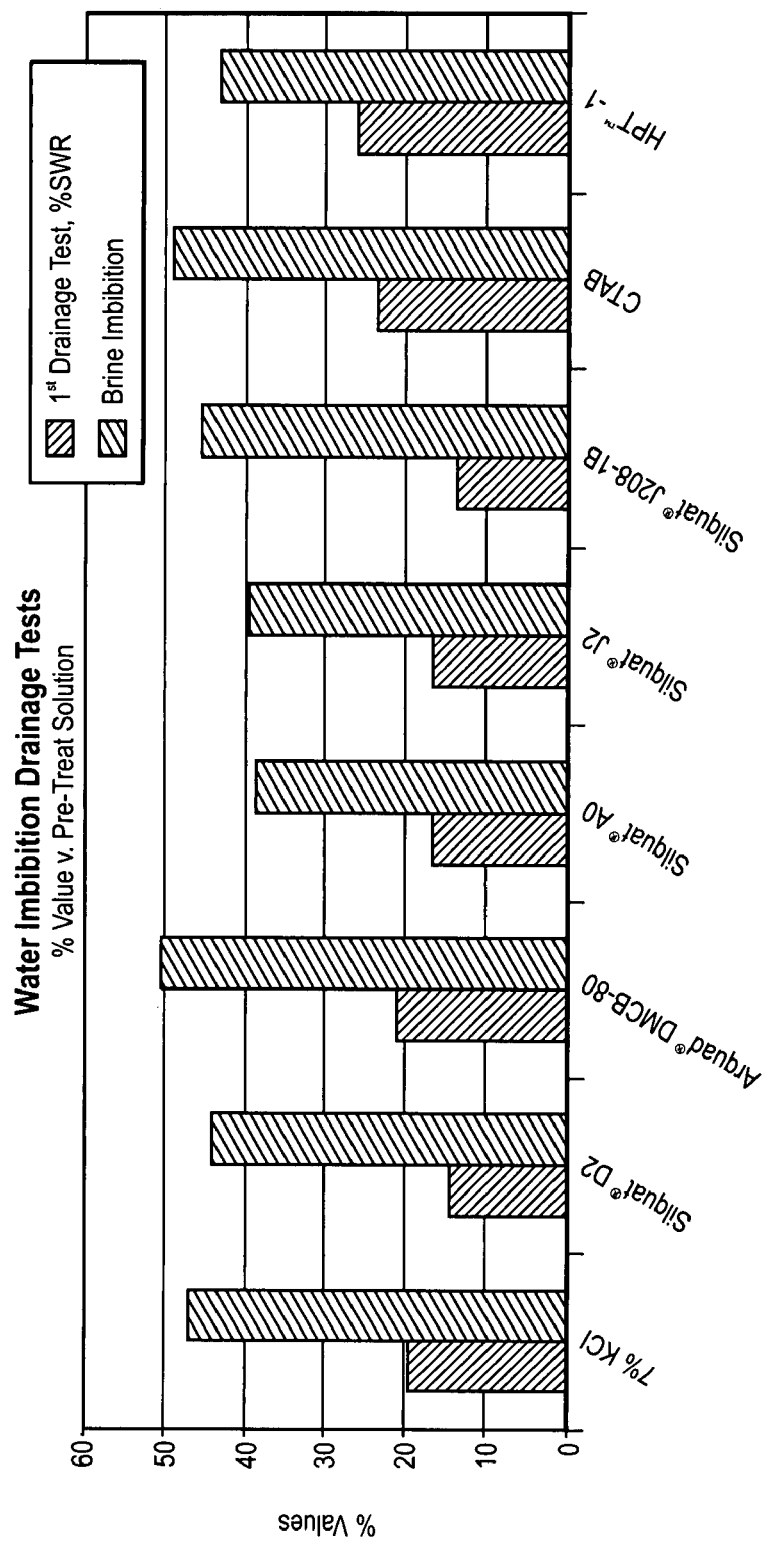
FIG. 2 is a graph of brine imbibition and percent residual water saturation for Berea sandstone cores treated with certain materials in a brine-based carrier fluid.

Next, the saturated core was centrifuged for 20 hours on each end at 1,440 rpm. The core was then removed from the centrifuge and weighed. Using the density of the carrier fluid, the residual water saturation ($S_{wr}$) of the core was determined based on the difference between saturated core weight and the weight after the centrifuge treatment. The % $S_{wr}$ for this first water-drainage test is shown below in Table 1 as well as on FIGS. 1 and 2. The residual water saturation is representative of the water-drainage rate for the core after treatment. From this data, the pore volume occupied by the residual treatment fluid and the unoccupied pore volume were determined.

Thereafter, the core was placed in 10 milliliters of a 7% potassium chloride solution in a small cup such that the entire surface of one end of the core was exposed to the brine to facilitate brine imbibition. This entire assembly was placed into a closed bottle. After two hours of exposure to the brine, the core was again weighed. Based on the difference between the weight of the core after brine exposure and the weight of the core after the centrifuge treatment, the volume of the brine imbibed into the core can be determined. By dividing the volume of the imbibed brine and the unoccupied pore volume, a percent value for brine imbibition into available porosity was calculated. The % brine imbibition for this test is shown below in Table 1 as well as on FIG. 2.

Figure 3:
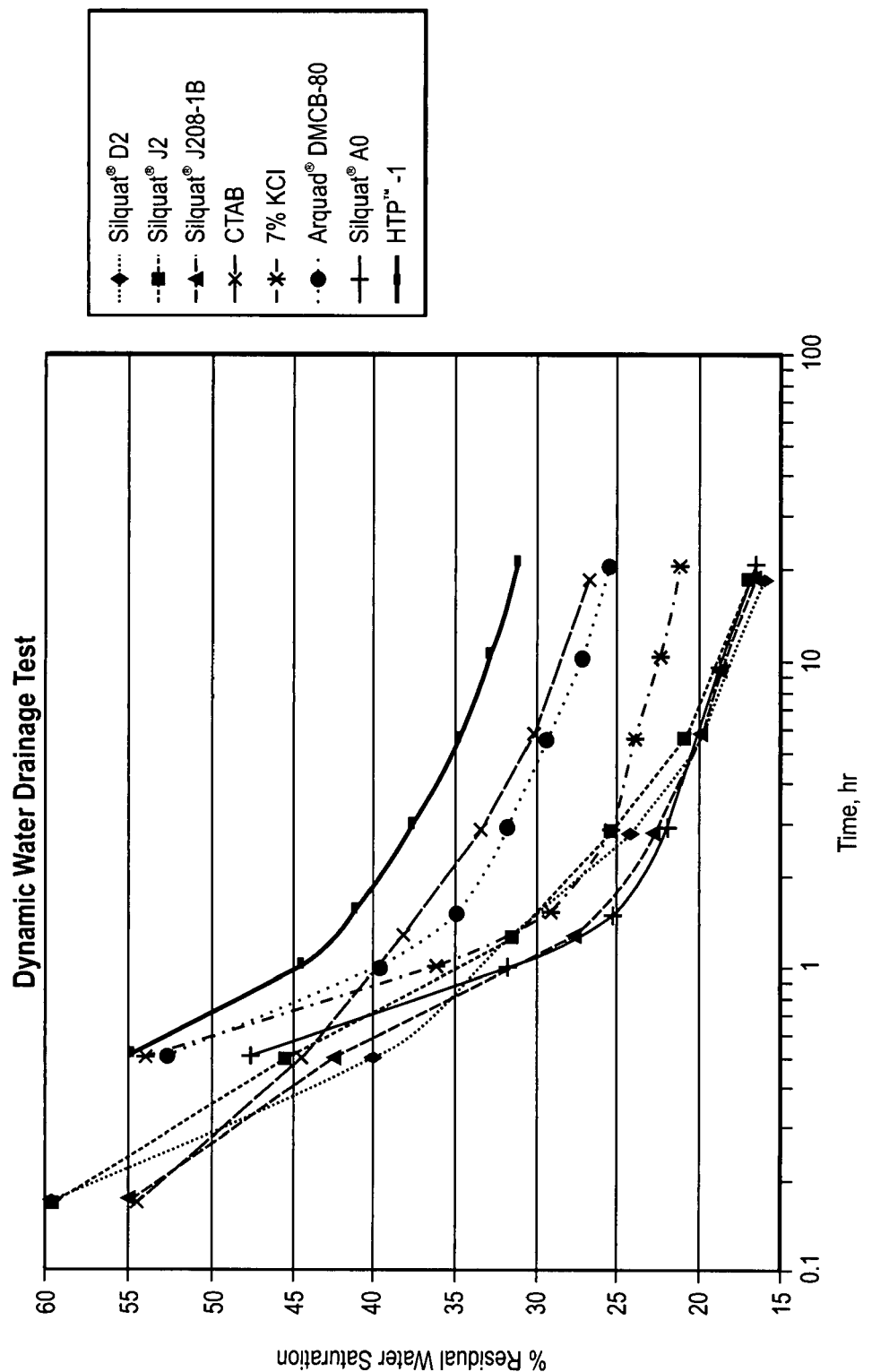
FIG. 3 is a graph of residual water saturation as a function of time for Berea sandstone cores treated with certain materials in a brine-based carrier fluid.

After the brine-imbibition test, a second water-drainage test was performed on the core. The core was immersed in 100 milliliters of a 7% sodium chloride solution and subjected to vacuum for three hours. Then, the core was centrifuged at 1,440 rpm, and the water-drainage rate was calculated as a function of time over a period of 21 hours to provide dynamic-water-drainage results. Measurements of the core weight were taken periodically by removing the core from the centrifuge. A final measurement of the core weight was recorded after 21 hours. From these measurements, the percent $S_{wr}$ was determined as described above. The final percent $S_{wr}$ for this second water-drainage test is shown below in Table 1 as well as on FIG. 1. In addition, the dynamic water-drainage results are provided on FIG. 3 as percent SW, as a function of time.

As previously mentioned, the percent $S_{wr}$ for the first water-drainage test, the percent $S_{wr}$ for the second water-drainage tests, and the percent brine imbibition for each of the tested materials are shown in Table 1 below. As previously mentioned, the percent $S_{wr}$ represents the water-drainage rate.

of the tested material in methanol, except for HPT-1 chemical additive, which was used in an amount of 0.2% wt/vol. For a control, tests were also performed with only methanol itself.

These tests were performed using high permeability (200-300 millidarcy) Berea sandstone cores in accordance with the following procedure. The Berea sandstone cores measured about 1 inch in diameter and about 2.8-3.3 inches in length. First, a dry core was vacuum saturated with the treatment fluid for two hours. It was determined that the core was fully saturated with the treatment fluid when no air bubbles could be seen exiting the core. The core was then weighed to determine the saturated core weight. Using the density of the carrier fluid, the pore volume of the core was determined based on the difference between the saturated core weight and the unsaturated core weight. The core was then allowed to sit at ambient temperature and pressure overnight.

Next, the saturated core was centrifuged alternately for 10 minutes on each end for a total of 40 minutes per core at 1,440 rpm. The core was then removed from the centrifuge and weighed. Using the density of the carrier fluid, the residual methanol saturation ($S_{mr}$) of the core was determined based on the difference between saturated core weight and the weight after the centrifuge treatment. The % $S_{mr}$ for this first drainage test is shown below in Table 2. The residual metha-

TABLE 1

Brine-Based Treatments

| Material | Chemical Description | Supplier | % $S_{WT}$ (1st Drainage Test) | % $S_{WT}$ (2nd Drainage Test) | % Brine Imbibition |
|---|---|---|---|---|---|
| 7% KCl | — | — | 20.2 | 21.1 | 47.1 |
| SILQUAT D2 silicone quat | Water-soluble organomodified PDMS silicone with dialkylquaternary ammonium chain end | Siltech Corp. | 14.5 | 16.0 | 43.9 |
| ARQUAD DMCB-80 | Cocobenzyldimethylammonium chloride | Akzo Nobel | 20.8 | 25.5 | 50.6 |
| SILQUAT AO silicone quat | Water-soluble organomodified PDMS silicone with dialkylquaternary ammonium chain end | Siltech Corp. | 16.3 | 16.7 | 38.7 |
| SILQUAT J2 silicone quat | Water-soluble organomodified PDMS silicone with dialkylquaternary ammonium chain end | Siltech Corp. | 16.6 | 16.9 | 39.6 |
| SILQUAT J208-1B silicone quat | Water-soluble organomodified PDMS silicone with dialkylquaternary ammonium chain end | Siltech Corp. | 13.4 | 16.6 | 45.4 |
| CTAB | Cetyltrimethylammonium bromide | Aldrich Chem. Co. | 23.4 | 26.7 | 48.9 |
| HPT-1 additive | Hydrophobically modified water soluble poly-(dimethylaminoethylmethacrylate) | Halliburton Energy Services, Inc. | 25.9 | 31.1 | 43.0 |

The results of this series of tests show that the certain materials (such as cationic polyorganosiloxanes that comprise at least two cationic quaternary ammonium groups) provide lower residual water saturation, lower water-imbibition rates, and/or faster water-drainage rates.

EXAMPLE 2

An additional series of tests was performed to further analyze the effects of a variety of materials on the water-imbibition and water-drainage rates of sandstone cores. The treatment fluids used in this series of tests comprised 1.0% wt/vol nol saturation is representative of the drainage rate for the core after treatment. From this data, the pore volume occupied by the residual treatment fluid and the unoccupied pore volume were determined.

Figure 4:
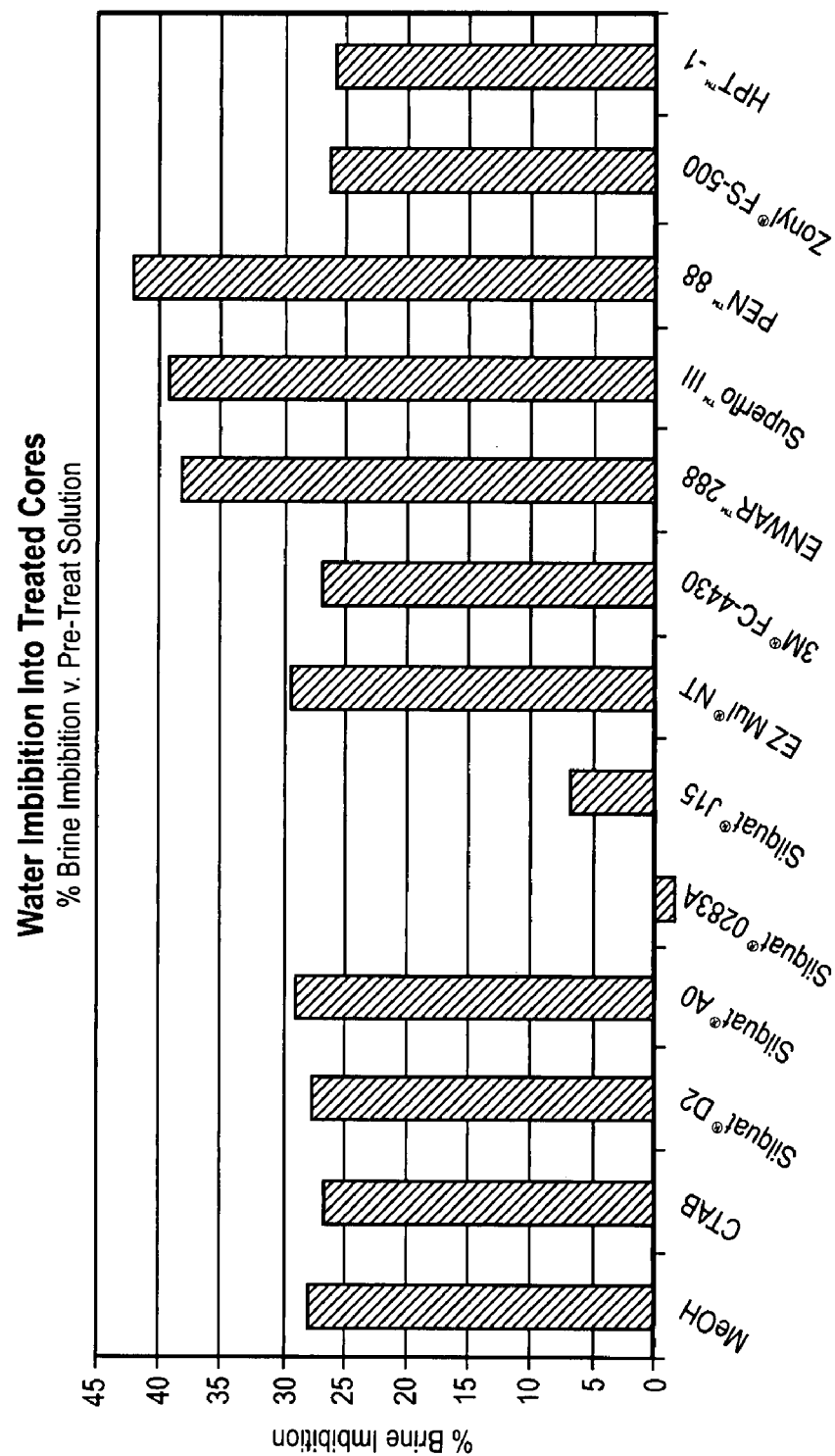
FIG. 4 is a graph of percent brine imbibition for Berea sandstone cores treated with certain materials in a methanol-based carrier fluid.
Figure 5:
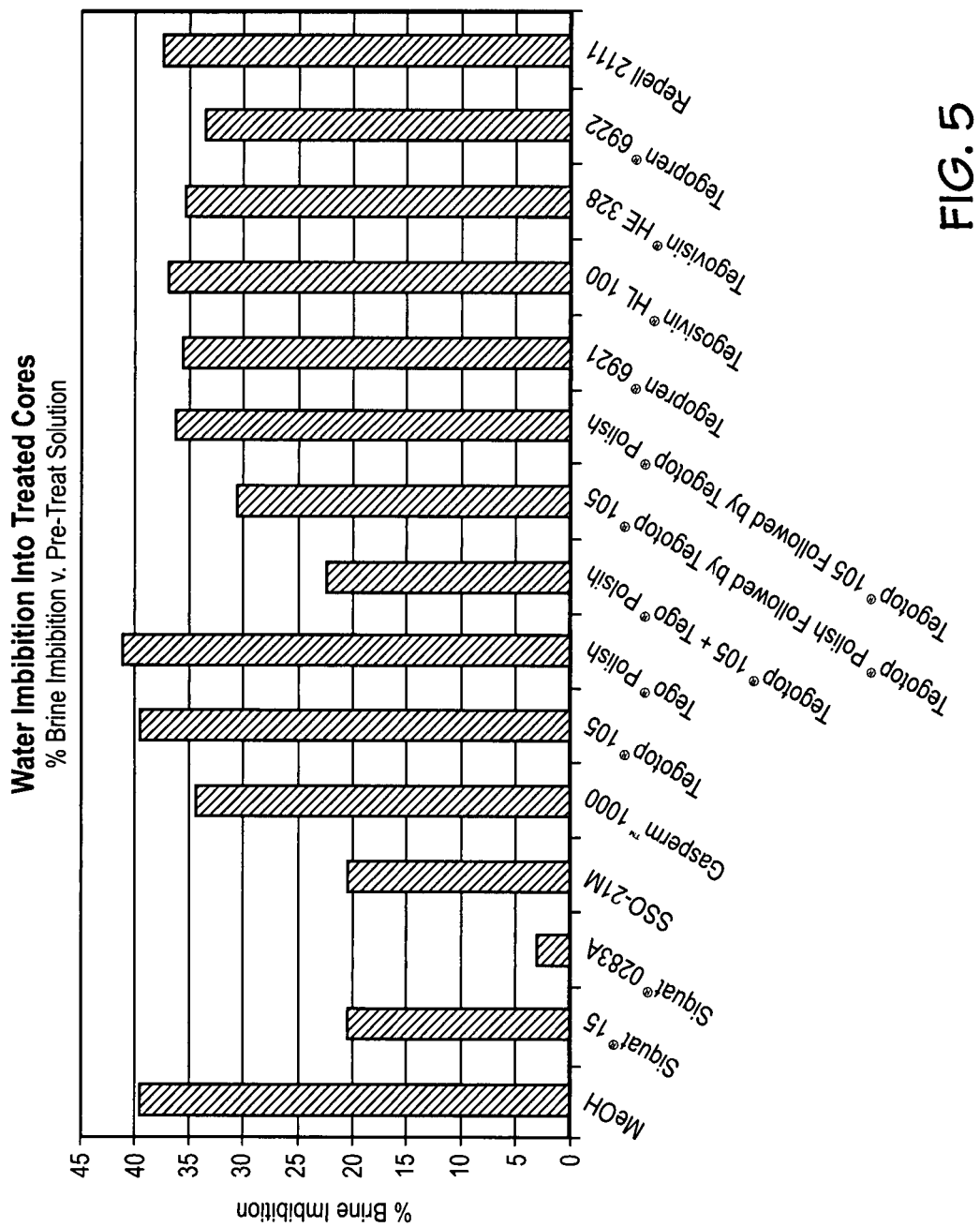
FIG. 5 is a graph of percent brine imbibition for Berea sandstone cores treated with certain materials in a methanol-based carrier fluid.

Thereafter, the core was placed in 10 milliliters of a 7% potassium chloride solution in a small cup such that the entire surface of one end of the core was exposed to the brine to facilitate brine imbibition. This entire assembly was placed into a closed bottle. After 10 minutes of exposure to the brine, the core was again weighed. Based on the difference between the weight of the core after brine exposure and the weight of the core after the centrifuge treatment, the volume of the brine imbibed into the core can be determined. By dividing the volume of the imbibed brine and the unoccupied pore volume, a percent value for brine imbibition into available porosity was calculated. The % brine imbibition for this test is shown below in Table 2 as well as in FIGS. 4 and 5.

Figure 6:
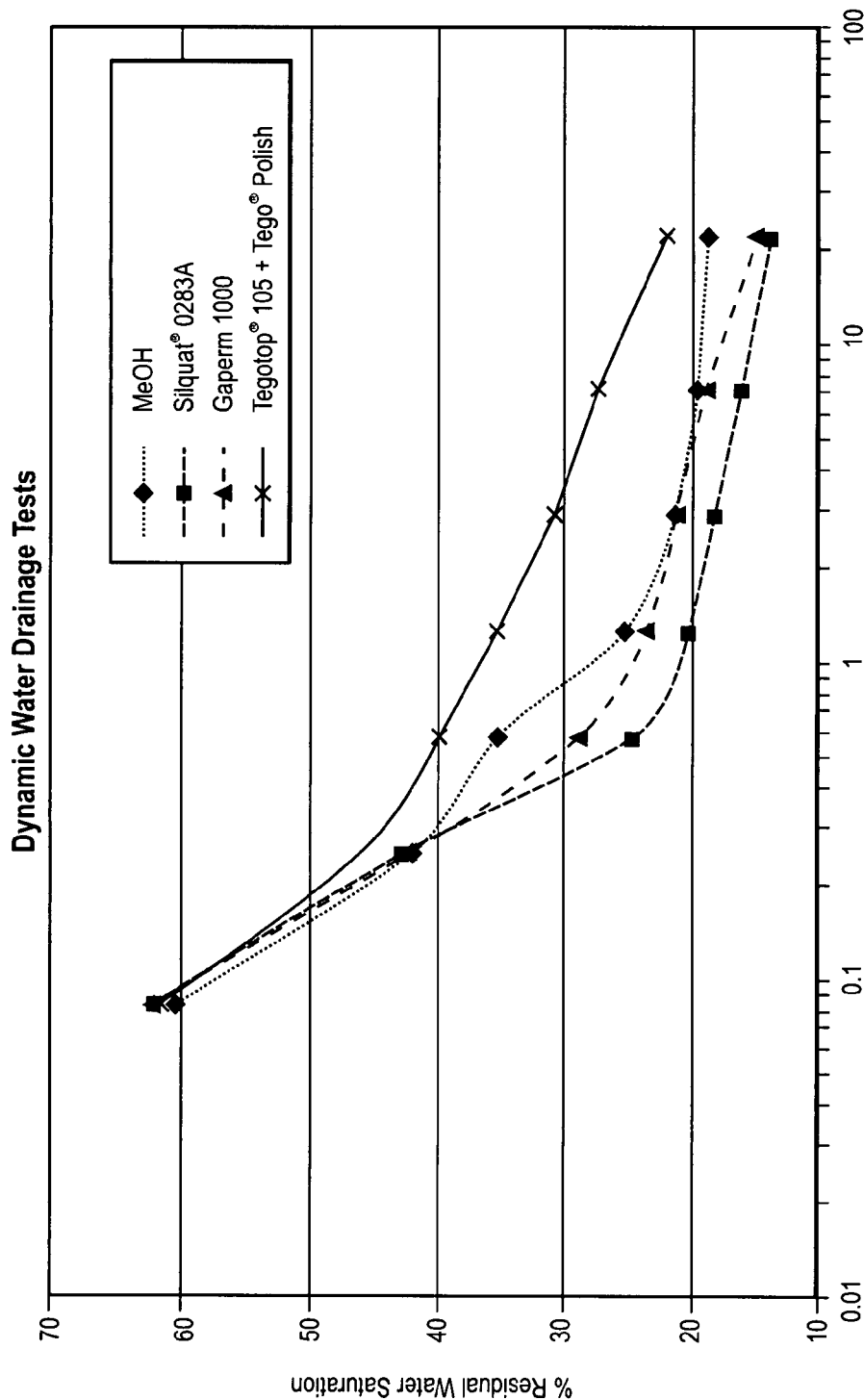
FIG. 6 is a graph of residual water saturation as a function of time for Berea sandstone cores treated with certain materials in a methanol-based carrier fluid.

After the brine-imbibition test, another water-drainage test was performed on the core. The core was immersed in 100 milliliters of a 7% potassium chloride solution and subjected to vacuum for three hours. Then, the core was centrifuged at 1,440 rpm, and the water-drainage rate was calculated as a function of time over a period of 22 hours to provide dynamic-water-drainage results. Measurements of the core weight were taken periodically by removing the core from the centrifuge. A final measurement of the core weight was recorded after 22 hours. From these measurements, the percent $S_{wr}$ was determined as described above. The final percent $S_{wr}$ for this second drainage test is shown below in Table 2. In addition, the dynamic water-drainage results are provided on FIG. 6 as percent $S_{wr}$ as a function of time.

As previously mentioned, the percent $S_{mr}$ for the first drainage test, the percent $S_{wr}$ for the second drainage test, and the percent brine imbibition for each of the tested materials are shown in Table 2 below. As will be appreciated, the drainage rates (represented by the percent $S_{mr}$) for the first drainage tests are less relevant because they are not for a water-based fluid and do not indicate how the tested materials would effect drainage rates of a water-based fluid.

TABLE 2

Methanol-Based Treatments

| Material | Chemical Description | Supplier | % $S_{WT}$ (first drainage test) | % $S_{WT}$ (second drainage test) | % Brine Imbibition |
|---|---|---|---|---|---|
| Methanol | — | — | 21.7 | n.d. | 27.8 |
| CTAB | Cetyltrimethylammonium bromide | Aldrich Chem. Co. | 23.9 | n.d. | 26.6 |
| SILQUAT D2 silicone quat | Water soluble organomodified PDMS silicone with dialkylquaternary ammonium chain end | Siltech Corp. | 22.0 | n.d. | 27.7 |
| SILQUAT AO silicone guat | | Siltech Corp. | 23.6 | n.d. | 29.0 |
| Experimental Product-SILQUAT 0283 A silicone quat | | Siltech Corp. | 20.9 | n.d. | −1.7 |
| SILQUAT J15 silicone quat | Water-soluble organomodified PDMS silicone with dialkylquaternary ammonium chain end | Siltech Corp. | 21.1 | n.d. | 6.8 |
| EZ MUL NT emulsifier | Water soluble organomodified PDMS silicone with dialkylquaternary ammonium chain end | Halliburton Energy Services, Inc. | 23.7 | n.d. | 29.3 |
| FC 4430 | Oil-soluble PDMS with quaternary ammonium chain end without long chain alkyl groups | 3M Corporation | 27.3 | n.d. | 26.9 |
| ENWAR 288 additive | Cationic fluorocarbon | Halliburton Energy Services, Inc. | 15.5 | n.d. | 38.3 |
| SUPERFLO surfactant | Nonionic fluorocarbon surfactant blend | Halliburton Energy Services, Inc. | 16.2 | n.d. | 39.2 |
| PEN 88 additive | Nonylphenol ethoxylate | Halliburton Energy Services, Inc. | 24.5 | n.d. | 42.1 |
| ZONYL FS-500 fluoro additive | Non-ionic fluoroaklyl compound | Dupont | 17.5 | n.d. | 26.2 |
| HPT-1 chemical additive | Hydrophobically modified water soluble poly-(dimethylaminoethylmethacrylate) | Halliburton Energy Services, Inc. | 20.9 | n.d. | 25.7 |
| Methanol | — | — | 18.7 | 18.5 | 39.5 |
| SILQUAT J15 silicone quat | Water-soluble organomodified PDMS silicone with dialkylquaternary ammonium chain end | | 23.7 | | 20.6 |

TABLE 2-continued

Methanol-Based Treatments

| Material | Chemical Description | Supplier | % $S_{WT}$ (first drainage test) | % $S_{WT}$ (second drainage test) | % Brine Imbibition |
|---|---|---|---|---|---|
| Experimental Product-SILQUAT 0283 A silicone guat | Oil soluble PDMS with quaternary ammonium chain end without long chain alkyl groups | Siltech Corp. | 20.7 | 13.7 | 3.0 |
| SSO-21M | Non-ionic surfactant blend | Halliburton Energy Services, Inc. | 27.3 | n.d. | 20.5 |
| GASPERM 1000 | Non-ionic surfactant blend | Halliburton Energy Services, Inc. | 23.0 | 14.8 | 34.6 |
| TEGOTOP 105 agent | Highly disperse silicon dioxide nano-particles in silicone wax and cyclomethicone | Degussa AG | 21.7 | n.d. | 39.5 |
| TEGO Polish | Methylpolysiloxane | Degussa AG | 21.7 | n.d. | 41.2 |
| TEGOTOP 105 agent + TEGO Polish | Highly disperse silicon dioxide nano-particles in silicone wax and cyclomethicone plus Methylpolysiloxane | Degussa AG | 23.4 | 21.9 | 22.5 |
| TEGO Polish followed by TEGOTOP 105 agent | Methylpolysiloxane followed by Highly disperse silicon dioxide nano-particles in silicone wax and cyclomethicone | Degussa AG | 21.8 | n.d. | 30.7 |
| TEGOTOP 105 agent followed by TEGO Polish | Highly disperse silicon dioxide nano-particles in silicone wax and cyclomethicone followed by Methylpolysiloxane | Degussa AG | 19.4 | n.d. | 36.4 |
| TEGOPREN 6921 agent | Diquaternary polydimethylsiloxane in propanediol | Degussa AG | 23.3 | n.d. | 35.7 |
| TEGOSIVIN HL100 agent | Methylethoxy polysiloxane | Degussa AG | 24.9 | n.d. | 37.0 |
| TEGOSIVIN HE328 agent | Silane/Siloxanes emulsion | Degussa AG | 26.3 | n.d. | 35.4 |
| TEGOPREN 6922 agent | Diquaternary polydimethylsiloxane | Degussa AG | 24.7 | n.d. | 33.6 |
| Repell 2111 agent | Triethoxy (3,3,4,4,5,5,6,6,7,7,8,8,8-tridecafluorooctyl) silane | Degussa AG | 22.8 | n.d. | 37.6 |

The results of this series of tests show that the certain materials (such as polyorganosiloxanes that comprise at least two quaternary ammonium groups) provide lower brine-imbibition rates.

The particular embodiments disclosed above are illustrative only, as the present invention may be susceptible to various modifications and alternative forms. However, it should be understood that the invention is not intended to be limited to the particular embodiments disclosed. Rather, the present invention is to cover all modifications, equivalents and alternatives falling with the scope and spirit of the present invention as defined by the following appended claims. In addition, every range of values (of the form, "from about a to about b," or, equivalently, "from approximately a to b," or, equivalently, "from approximately a-b") disclosed in the present Description of Specific Embodiments is to be understood as referring to the power set (the set of all subsets) of the respective range of values, and set for the every range encompassed within the broader range of value.

What is claimed is:

1. A method of treating a subterranean formation such that initiation of gas production is enhanced following the treatment, comprising:

introducing a relative-permeability modifier into the subterranean formation such that the relative-permeability modifier reduces permeability of the subterranean formation to aqueous fluids, wherein the relative-permeability modifier comprises a water-soluble polymer; and introducing a water-drainage-rate-enhancing agent into the subterranean formation, wherein the water-drainage-rate-enhancing agent comprises at least one compound selected from the group consisting of:

a zwitterionic surfactant comprising an organic surfactant comprising an alkyl chain length of from about 12 to about 22 carbons, a cationic group, and an anionic group;

a cationic polyorganosiloxane comprising at least two quaternary ammonium groups;

a nonionic surfactant selected from the group consisting of:

an organic surfactant having the structure shown below:

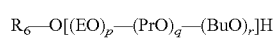

$R_6$—O[(EO)$_p$—(PrO)$_q$—(BuO)$_r$]H wherein $R_6$ is an alcohol, phenol or phenol derivative or a fatty acid comprising about 12 to about 22 carbons, EO is an ethylene oxide radical, p is 1 to 20, PrO is a propylene oxide radical, q is 0 to 15, BuO is a butylene oxide radical, and r is 0 to 15;

an organic polyethylene carbonate having the structure shown below:

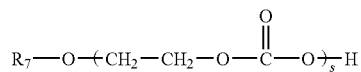

wherein R7 is an alcohol comprising from about 7 to about 16 carbons and s is 7 to 16;

a butoxylated glycol comprising 1 to 15 butylene oxide groups; and an ethoxylated-butoxylated glycol comprising 1 to 5 ethylene oxide groups and 5 to 10 butylene oxide group; and any combination thereof.

2. The method of claim 1, wherein the water-drainage-rate-enhancing agent is introduced into the subterranean formation after the relative-permeability modifier is introduced into the subterranean formation.

3. The method of claim 1, wherein at least a portion of the relative-permeability modifier is introduced into a high-permeability, gas-producing zone of the subterranean formation, and wherein at least a portion of the water-drainage-rate-enhancing agent is introduced into a low-permeability, gas-producing zone of the subterranean formation.

4. The method of claim 1, comprising producing gas from the subterranean formation after introducing the relative-permeability modifier and the water-drainage-rate-enhancing agent.

5. The method of claim 1, wherein the relative-permeability modifier comprises a water-soluble polymer, wherein the water-soluble polymer comprises a hydrophobically modified polymer, wherein the hydrophobically modified polymer comprises a polymer backbone and a hydrophobic branch, and wherein the hydrophobic branch comprises an alkyl chain of about 4 to about 22 carbons.

6. The method of claim 5, wherein the hydrophobically modified polymer comprises an amino methacrylate/alkyl amino methacrylate copolymer.

7. The method of claim 5, wherein the polymer backbone comprises polar heteroatoms.

8. The method of claim 5, wherein the alkyl chain comprises about 12 to about 18 carbons.

9. The method of claim 1, wherein the relative-permeability modifier comprises a hydrophobically modified polymer, wherein the relative-permeability modifier comprises a reaction product of at least one hydrophobic compound and at least one hydrophilic polymer.

10. The method of claim 9, wherein the hydrophilic polymer comprises reactive amino groups in the polymer backbone or as pendant groups.

11. The method of claim 9, wherein the hydrophilic polymer comprises dialkyl amino groups.

12. The method of claim 1, wherein the relative-permeability modifier comprises a hydrophobically modified polymer synthesized from a polymerization reaction that comprises a hydrophilic monomer and a hydrophobically modified hydrophilic monomer, wherein the hydrophobically modified polymer comprises a hydrophobic branch, and wherein the hydrophobic branch comprises an alkyl chain of about 4 to about 22 carbons.

13. The method of claim 1, wherein the relative-permeability modifier comprises a hydrophilically modified polymer, wherein the hydrophilically modified polymer is water soluble.

14. The method of claim 1, wherein the water-drainage-rate-enhancing agent comprises a zwitterionic surfactant comprising an organic surfactant comprising an alkyl chain length of from about 12 to about 22 carbons, a cationic group, and an anionic group.

15. The method of claim 1, wherein the water-drainage-rate-enhancing agent comprises at least one nonionic surfactant selected from the group consisting of:

an organic surfactant having the structure shown below:

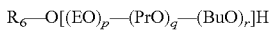

wherein $R_6$ is an alcohol, phenol or phenol derivative or a fatty acid comprising about 12 to about 22 carbons, EO is an ethylene oxide radical, p is 1 to 20, PrO is a propylene oxide radical, q is 0 to 15, BuO is a butylene oxide radical, and r is 0 to 15;

an organic polyethylene carbonate having the structure shown below:

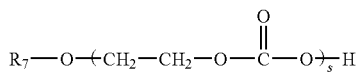

wherein R7 is an alcohol comprising from about 7 to about 16 carbons and s is 7 to 16;

a butoxylated glycol comprising 1 to 15 butylene oxide groups; and an ethoxylated-butoxylated glycol comprising 1 to 5 ethylene oxide groups and 5 to 10 butylene oxide group.

16. The method of claim 1, wherein the water-drainage-rate enhancing agent comprises a cationic polyorganosiloxane comprising at least two quaternary ammonium groups.

17. The method of claim 1, wherein the water-drainage-rate enhancing agent comprises a polydimethylsiloxane comprising at least two dialkyl quaternary ammonium groups.

18. The method of claim 1, wherein the water-drainage-rate-enhancing agent comprises a solvent-surfactant blend comprising a solvent, a surfactant, an alcohol, wherein the water-drainage-rate-enhancing agent is introduced into the portion of the subterranean formation in a microemulsion comprising a carrier fluid and the solvent-surfactant blend.

19. A method of treating a subterranean formation with a relative-permeability modifier such that gas production is enhanced following the treatment, comprising:

introducing a treatment fluid into at least a portion of the subterranean formation, wherein the treatment fluid comprises:

an aqueous fluid;

the relative-permeability modifier in an amount in the range of from about 0.05% to about 1% by weight of the treatment fluid, wherein the relative-permeability modifier comprises a water-soluble polymer; and a water-drainage-rate-enhancing agent in an amount in the range of from about 0.5% to about 5% by weight of the treatment fluid.

20. The method of claim 19, wherein the water-soluble polymer comprises a hydrophobically modified polymer, wherein the hydrophobically modified polymer comprises a polymer backbone and a hydrophobic branch, and wherein the hydrophobic branch comprises an alky chain of about 4 carbons to about 22 carbons.

21. The method of claim 20, wherein the alkyl chain comprises about 12 to about 18 carbons.

22. The method of claim 21, wherein the water-soluble polymer comprises a hydrophobically modified polymer that is a reaction product of a hydrophobic compound and a hydrophilic polymer, wherein the hydrophilic polymer comprises reactive amino groups in the polymer backbone or as pendant groups, and wherein the hydrophobic compound comprises an alkyl halide having an alkyl chain length of from about 4 carbons to about 22 carbons.

23. The method of claim 19, wherein the water-drainage-rate-enhancing agent comprises a solvent-surfactant blend comprising a solvent, a surfactant, an alcohol, and wherein the treatment fluid comprises an oil-in-water microemulsion comprising the water-drainage-rate-enhancing agent, the aqueous fluid, and the relative-permeability modifier.

24. The method of claim 19, wherein the water-drainage-rate enhancing agent comprises a cationic polyorganosiloxane comprising at least two quaternary ammonium groups.

25. A method of treating a subterranean formation comprising combining a water-drainage-rate-enhancing agent with a relative-permeability-modifier treatment to decrease water production from the subterranean formation, such that initiation of gas production from the subterranean formation following the relative-permeability-modifier treatment is enhanced, wherein the water-drainage-rate-enhancing agent comprises at least one compound selected from the group consisting of:

a zwitterionic surfactant comprising an organic surfactant comprising an alkyl chain length of from about 12 to about 22 carbons, a cationic group, and an anionic group;

a cationic polyorganosiloxane comprising at least two quaternary ammonium groups;

a nonionic surfactant selected from the group consisting of:
an organic surfactant having the structure shown below:

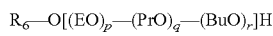

wherein $R_6$ is an alcohol, phenol or phenol derivative or a fatty acid comprising about 12 to about 22 carbons, EO is an ethylene oxide radical, p is 1 to 20, PrO is a propylene oxide radical, q is 0 to 15, BuO is a butylene oxide radical, and r is 0 to 15;

an organic polyethylene carbonate having the structure shown below:

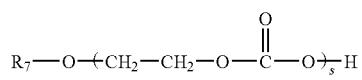

wherein R7 is an alcohol comprising from about 7 to about 16 carbons and s is 7 to 16:

a butoxylated glycol comprising 1 to 15 butylene oxide groups; and an ethoxylated-butoxylated glycol comprising 1 to 5 ethylene oxide groups and 5 to 10 butylene oxide group; and any combination thereof.

26. A treatment fluid comprising a carrier fluid, a relative-permeability modifier, and a water-drainage-rate-enhancing agent, wherein the relative-permeability modifier comprises a water-soluble polymer, wherein the water-drainage-rate-enhancing agent comprises at least one compound selected from the group consisting of:

a zwitterionic surfactant comprising an organic surfactant comprising an alkyl chain length of from about 12 to about 22 carbons, a cationic group, and an anionic group;

a cationic polyorganosiloxane comprising at least two quaternary ammonium groups;

a nonionic surfactant selected from the group consisting of:
an organic surfactant having the structure shown below:

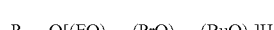

wherein $R_6$ is an alcohol, phenol or phenol derivative or a fatty acid comprising about 12 to about 22 carbons, EO is an ethylene oxide radical, p is 1 to 20, PrO is a propylene oxide radical, q is 0 to 15, BuO is a butylene oxide radical, and r is 0 to 15;

an organic polyethylene carbonate having the structure shown below:

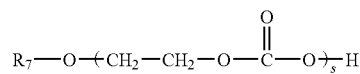

wherein R7 is an alcohol comprising from about 7 to about 16 carbons and s is 7 to 16;

a butoxylated glycol comprising 1 to 15 butylene oxide groups; and an ethoxylated-butoxylated glycol comprising 1 to 5 ethylene oxide groups and 5 to 10 butylene oxide group; and any combination thereof.

* * * * *